Feb. 28, 1967 D. D. DAVIS 3,306,932
PROCESS FOR THE PREPARATION OF DICARBOXYLIC ACIDS
Filed Oct. 29, 1963 3 Sheets-Sheet 1
FIG. I
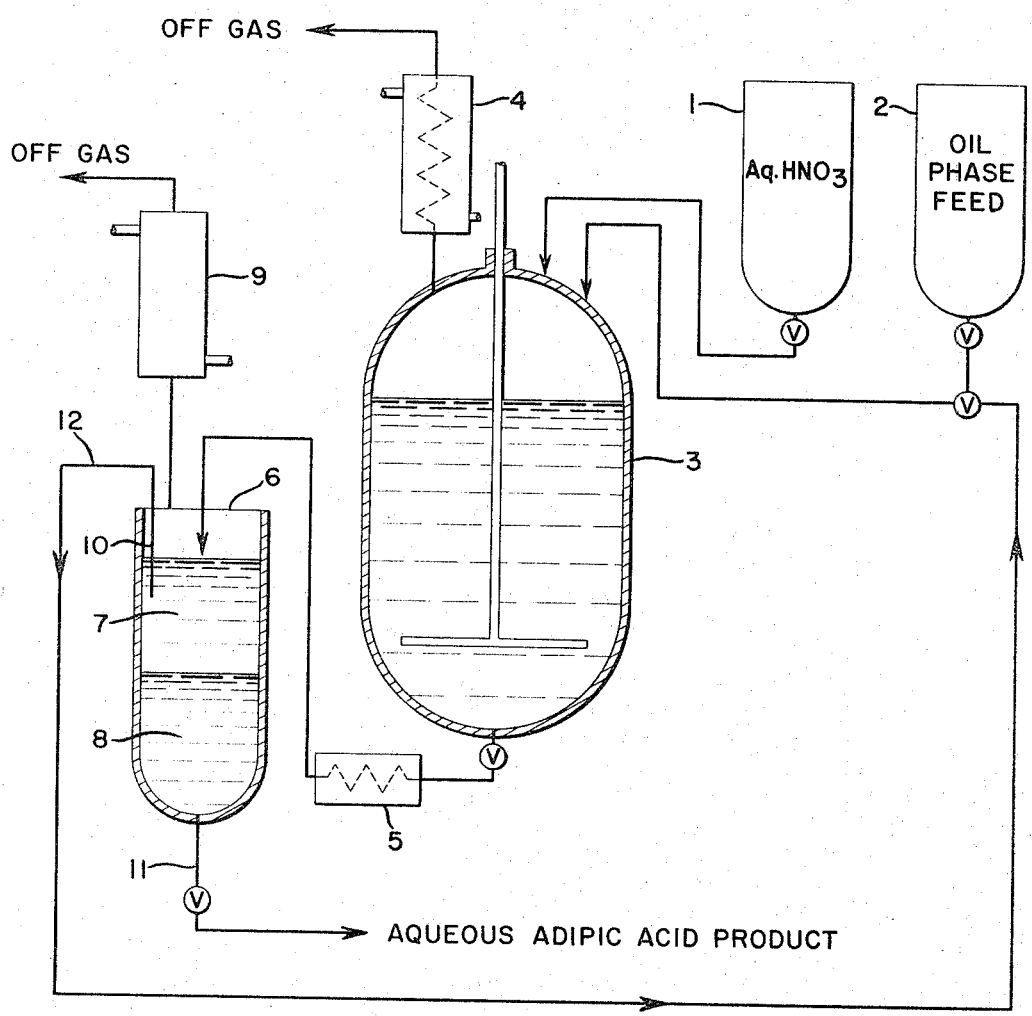
INVENTOR
DARWIN D. DAVIS
BY Roger A. Hines
ATTORNEY

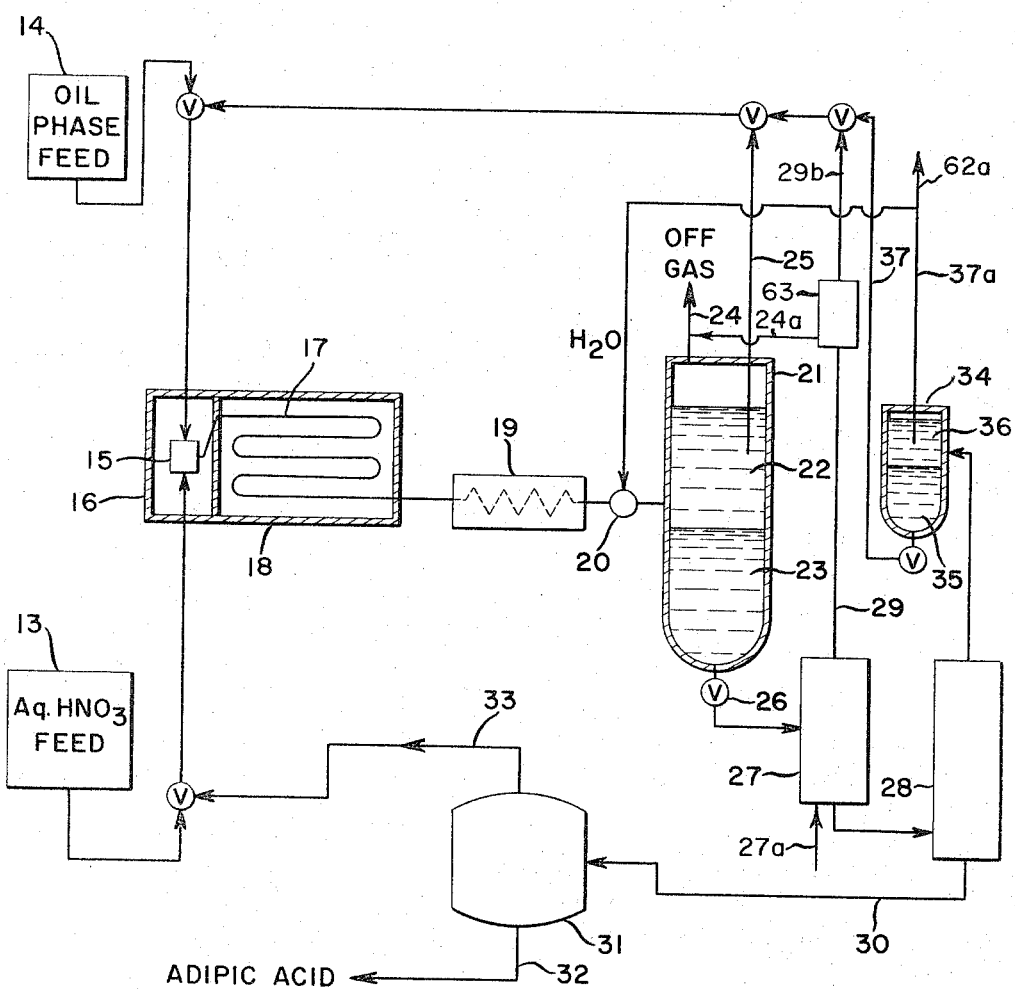
FIG. II

Feb. 28, 1967  D. D. DAVIS  3,306,932
PROCESS FOR THE PREPARATION OF DICARBOXYLIC ACIDS
Filed Oct. 29, 1963  3 Sheets-Sheet 3
FIG. III
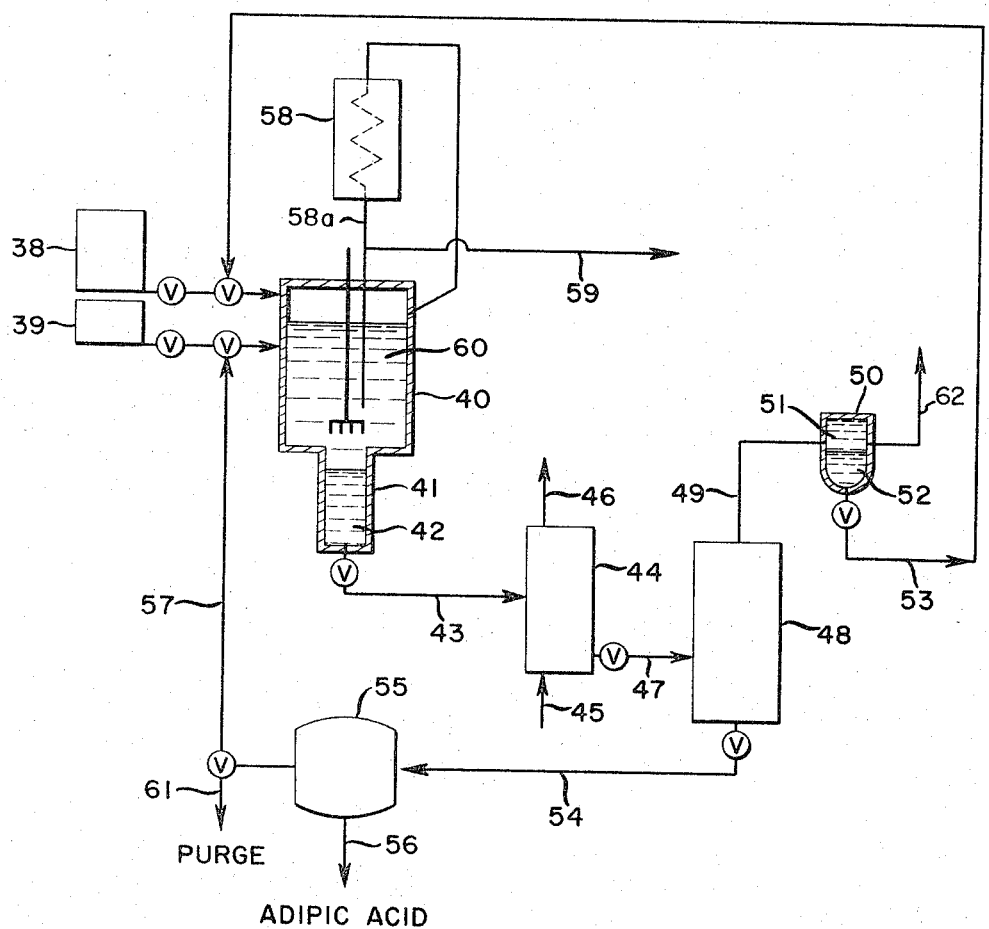
INVENTOR
DARWIN D. DAVIS
BY Roger A. Hines
ATTORNEY

United States Patent Office 3,306,932
Patented Feb. 28, 1967

3,306,932
PROCESS FOR THE PREPARATION OF DICARBOXYLIC ACIDS
Darwin Darrell Davis, Orange, Tex., assignor to E. I. du Pont de Nemours and Company, Wilmington, Del., a corporation of Delaware
Filed Oct. 29, 1963, Ser. No. 319,809
15 Claims. (Cl. 260—533)

This invention is concerned with an improved process for the preparation of disarboxylic acids from saturated, cyclic hydrocarbons (cycloalkanes). More particularly, this invention is concerned with a one-step process for the preparation of adipic acid in high yield by the oxidation of cyclohexane, employing aqueous nitric acid as oxidant, in which the oxidation is carried out in the presence of an organic nitro-compound as solvent.

Dicarboxylic acids containing 4–12 carbon atoms have wide utility in the preparation of condensation polymers such as polyamides and polyesters, as well as in the preparation of plasticizers. Adipic acid is a material which is prepared on a vast scale today for use in nylon and as a component of various ester plasticizers. It is also used on a considerable scale as a food acid. Many processes have been disclosed for the preparation of adipic acid and a great deal of effort has been spent in trying to improve the yields of adipic acid which are achievable from cyclohexane oxidation and at the same time to cut down on the amount of waste by-products formed, and thus to decrease the cost of the adipic acid.

Commercial processes for the preparation of adipic acid generally are based on, first, an oxidation of cyclohexane with molecular oxygen to form primarily a mixture of cyclohexanol and cyclohexanone, separation of these products from at least some of the by-products which will include many esters and polymeric materials which are not convertible to adipic acid, as well as some which are, and subsequent nitric acid oxidation of the cyclohexanol and cyclohexanone to give adipic acid. Many problems in separation of reactants and products, in recirculation of cyclohexane free from injurious by-products, separation of the cyclohexanol and cyclohexanone from other byproducts, and from the cyclohexane, and separation of the products of nitric acid oxidation have made this a rather complicated process involving a number of processing steps.

It was recognized fairly early that it would be desirable to simplify this synthesis of adipic acid from cyclohexane by oxidation of the cyclohexane in one step to adipic acid. Essentially two different approaches were taken to this. One involved various attempts to oxidize the cyclohexane all the way to adipic acid with molecular oxygen, and another involved various proposed processes for oxidizing the cyclohexane all the way to adipic acid with a chemical oxidizing agent such as nitric acid or mixture of nitric acid and nitrogen dioxide or nitrogen tetroxide. An example of the latter type of process is disclosed in United States Patent 2,228,261, Ellingboe, patented January 14, 1941. Subsequently, other patents have been issued describing improvements in this process, including Cavanagh and Nagel, U.S. 2,343,534, Doumani et al., U.S. 2,459,690, and U.S. 2,465,984.

Experience with these various processes for nitric acid oxidation of cyclohexane has shown that they have certain inherent disadvantages which have not made them economically competitive with the two-stage process in which the cyclohexane is first oxidized with molecular oxygen and subsequently the cyclohexane and cyclohexanol and other adipic acid precursors are oxidized with nitric acid to yield adipic acid.

Among these deficiencies, the most important which might be noted are that a large quantity of nitric acid is converted to $N_2O$ and $N_2$, which are not recoverable as $HNO_3$ and are thus lost; also, more nitric acid and a large percentage of the cyclohexane are converted to various nitrocyclohexanes, of which only mononitrocyclohexane is convertible in any appreciable yield to adipic acid, and this at a slow rate (about $\frac{1}{10}$ the rate at which adipic acid is formed from cyclohexane).

As an explanation of the above observations, it is known that the mechanisms by which naphthenic hydrocarbons are attacked by aqueous $HNO_3$ is by attack on the hydrocarbon by the radical-like $NO_2$ molecule; this can be illustrated for cyclohexane by the equation:

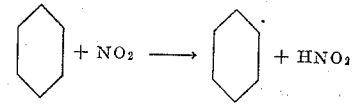

Subsequently the cyclohexyl radical reacts with additional $NO_2$ by two competing mechanisms to provide two products, cyclohexyl nitrite and nitrocyclohexane, according to the equation:

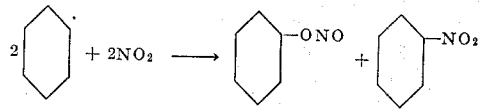

The cyclohexyl nitrite may be readily hydrolyzed to cyclohexanol which is then oxidized to adipic acid by aqueous nitric acid, which, it is known, forms an equilibrium mixture in water which can be represented by the equation:

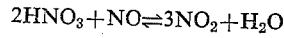

$$2HNO_3 + NO \rightleftharpoons 3NO_2 + H_2O$$

The nitrocyclohexane is not as readily converted to adipic acid by aqueous nitric acid. Prior art processes therefore have suffered from the great disadvantage of a major loss of nitric acid and cyclohexane to this by-product. Prior to the present invention, no way was known to eliminate this apparently irreversible loss.

Another disadvantage that was inherent in these processes was that it was found that the conditions required for the nitric acid oxidation of the cyclohexane produced considerable degradation of the adipic acid formed so that the percentage of adipic acid in the mixture of dibasic acids formed was generally of the order of 50–60%, the rest being acids such as gutaric acid, succinic acid, and oxalic acid. Considerable quantities of monobasic acids were also formed.

Therefore, it is an object of this invention to provide an improvement in the process for the one-step preparation of dicarboxylic acids from cycloalkanes containing 5–12 carbon atoms by oxidation with nitric acid whereby the overall yield of the dicarboxylic acid having the same number of carbon atoms as the cycloalkane oxidized will be as great as, and in the preferred process, greater than can be achieved in the two-stage processes of the art and at the same time, the net loss or consumption of nitric acid and cyclohexane to undesirable by-products will be substantially less than that obtained in the oxidation of cyclohexanol and cyclohexanone with nitric acid. It is also an object of this invention to provide a process in which both dicarboxylic acids and nitrocycloalkanes can be made simultaneously in high combined yield from a cycloalkane while controlling the ratio of these products produced according to the demands for each product. Other objects and advantages will become apparent hereinafter.

In accordance with the objects of this invention, it has now been discovered that cycloalkanes can be converted in high yields to dicarboxylic acids having the same number of carbon atoms as the cycloalkane by oxidation in the liquid state at 75° to 130° C. with aqueous nitric acid having a concentration of $HNO_3$ in the range of 35% to 80% by weight by conducting the oxidation in the presence of from about 10% to 97% by weight, on an organics basis, in the oil (organic) phase of a solvent for the cycloalkane consisting of at least one organic nitro-compound selected from the group consisting of nitro-hydrocarbons and nitrocarboxylic acids, for example mono- and dinitroalkanes, mono- and dinitrocycloalkanes, and nitro-aromatics such as nitrobenzene and p-nitrobenzoic acid. Under these conditions the loss of $HNO_3$ by conversion to irrecoverable $N_2$ and $N_2O$ is greatly reduced as compared with prior art experience with the nitric acid oxidation of cycloalkanes, and also the net conversion of $HNO_3$ and cycloalkane to nitrocycloalkanes can be reduced to any desired level. Under the preferred conditions of this invention, the organic nitro-compound employed as solvent is a nitrocycloalkane derived from the cycloalkane being oxidized and the net yield of nitrocycloalkane obtained can be reduced to zero. High conversions per pass of cycloalkane to dicarboxylic acids can be achieved by the process of this invention and, under preferred conditions, 100% conversion per pass with yields of 80% to 90% of the dicarboxylic acid having the same number of carbon atoms as the cycloalkane are achieved.

By the process of this invention cyclohexane can be converted to adipic acid in yields of 74–90% by oxidation with nitric acid in a nitroalkane, nitrocycloalkane, or nitro-aromatic compound, e.g. nitrocyclohexane and/or 1,1-dinitrocyclohexane, or nitrobenzene as solvent. Similar improved results are achieved with other cycloalkanes. Thus, by the process of this invention, cyclopentane can be converted in high yield to glutaric acid, cyclooctane can be converted to suberic acid, cyclodecane can be converted to sebacic acid, and cyclododecane can be converted to dodecanedioic acid in high yield. For the successful operation of this process, it has been found that it is essential that the nitric acid be present in molar excess to the cycloalkane and that the aqueous nitric acid employed in the reactor have a concentration greater than 35% $HNO_3$ and preferably of the order of 40% to 60% $HNO_3$. It is also essential to the successful operation of this process that the organic nitro-compound represent at least 10%, preferably 40% to 97%, and, for production of only dicarboxylic acid with no net yield of nitro-cycloalkane, preferably from 50% to 80% of the oil phase (exclusive of inorganic materials) which comprises the organic nitro-compound and the cycloalkane. It is also essential that vanadium be present, which is conveniently added as any vanadium salt such as ammonium vanadate, sodium vanadate, vanadyl nitrate ($VO(NO_3)_2$) or vanadyl sulfate. The vanadium catalyst directs the reaction to produce a maximum yield of the dicarboxylic acid containing the same number of carbon atoms as the cycloalkane and minimizes degradation to lower dicarboxylic acids. Copper has also been found to be beneficial in increasing reaction rate and improving product distribution. The copper can be added as metal (which then is converted to the nitrate) as cupric or cuprous oxide, as copper salts (acetate, nitrate, sulfate, etc.) or as complexes such as cuprammonium acetate. The oxidation can be carried out over a range of temperatures from 75°–130° C., preferably between 90° and 120° C. under pressure sufficient to maintain a major part of the cycloalkane in the liquid phase.

It has been found that in the presence of an organic nitro-compound such as a nitrohydrocarbon, e.g. nitrocyclohexane, sufficient nitric acid and $NO_2$ are soluble in the oil phase to cause most of the oxidation reaction to occur in this oil phase, rather than in the aqueous phase as in prior art synthesis where aqueous nitric acid was reacted with cycloalkane alone. The dicarboxylic acid which is formed, however, is more soluble in the aqueous phase and is therefore extracted out of the oil phase into the aqueous phase during the course of the reaction.

The organic nitro-compound employed as solvent may be a nitrocycloalkane derived from the cycloalkane being oxidized. Thus, in the case of cyclohexane, the preferred solvents are nitrocyclohexane and 1,1-dinitrocyclohexane; in the case of cyclododecane, however, preferred solvents are nitrocyclohexane or nitropropane. However, other nitro-compounds such as 2-nitropropane, 2-nitrobutane, nitrocyclopentane, nitrobenzene, nitrocarboxylic acids and precursors of nitrocarboxylic acids such as nitrocompounds readily oxidized to nitrocarboxylic acids such as nitroalcohols, nitroketones, and alkyl-substituted nitrobenzenes, and the like are likewise effective solvents for the process of this invention. Organic nitro-compounds containing halogens should be avoided because of the potential corrosive effects of mixtures such as $HNO_3/HCl$. Likewise, nitro-amines are undesirable because of side reactions and explosion hazards.

In view of the free-radical nature of the reactions, which makes them irreversible reactions, between the cyclohexyl radical and $NO_2$, it was most unexpected to discover that the reaction to give nitrocyclohexane,

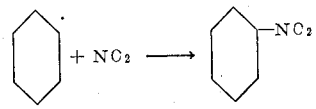

can be essentially blocked by carrying out the oxidation of cyclohexane in the presence of an organic nitro-compound, or mixture of compounds, as solvent, while the competing reaction to produce cyclohexyl nitrite proceeds smoothly and rapidly in high yield.

A possible explanation of this discovery may be that the presence of an organic nitro-compound as solvent provides an environment in which $NO_2$ ($N_2O_4$) is soluble in the oil phase and in which the electronic configuration of the dissolved $NO_2$ or $N_2O_4$ is affected by complex formation with the organic nitro-compound in a manner which favors the formation of C–O bonds on reaction with the cyclohexyl radical in the oil phase, to form cyclohexyl nitrite according to the equation:

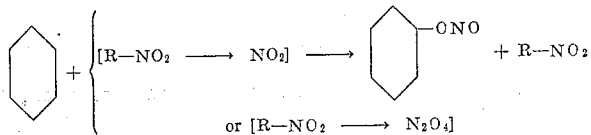

R=alkyl, cycloalkyl, aryl, nitrocycloalkyl, etc. It should be noted that other nitroparaffins, for instance 2-nitropropane, have been found to be equally as effective as nitrocyclohexane as solvents to direct the reaction to the production of high yields of adipic acid from cyclohexane for this process. Likewise nitroaromatics such as nitrobenzene and p-nitrobenzoic acid are effective solvents for this process. The same effect has been found to apply to the oxidation of other cycloparaffins in the $C_5$ to $C_{12}$ range. Specifically, the process of this invention is effective to give high yields of glutaric acid from cyclopentane, suberic acid from cyclooctane, sebacic acid from cyclodecane, and dodecanedioic acid from cyclododecane as well as of adipic acid from cyclohexane.

The reaction is conveniently carried out in a continuous pass-through, stirred autoclave process such as is shown in FIGURES I and III, or in a continuous, tubular reactor process as shown in FIGURE II. Contact time for optimum conversion and yield in the reactors should be from 0.5 to 60 minutes, depending on the other reaction conditions.

FIGURE I illustrates one method for carrying out the process of this invention to make adipic acid using a continuous pass-through autoclave 3 as the reactor. Aqueous nitric acid from make-up tank 1 and the oil-phase containing cyclohexane in nitrocyclohexane as solvent from make-up tank 2 are passed to a stirred autoclave 3, which is equipped with condenser 4 which permits off-gases comprising $N_2$, $N_2O$, NO, CO, $CO_2$, and $NO_2$ to escape to a nitrogen oxides recovery system (not shown) where NO and $NO_2$ are oxidized to nitric acid and recycled to the aqueous nitric acid makeup tank. From the autoclave, the reaction product mixture is passed through a cooler 5 to a separator 6 where the lighter oil phase 7 separates on top of the aqueous phase 8 which contains the adipic acid product. The latter is drawn off from the bottom of the separator and passed by line 11 to adipic acid recovery and refining train (not shown). The oil phase 7 comprising unreacted cyclohexane in nitrocyclohexane (also some 1,1-dinitrocyclohexane) is withdrawn from separator 6 through tube 10 and recycled through line 12 to the oil phase fed to the reactor. The off-gas from condenser 9 consisting largely of NO and $NO_2$ is passed to the nitrogen oxides recovery system (not shown).

FIGURE II illustrates another method for carrying out the process of this invention to make adipic acid using a continuous tubular reactor 17 as the reactor instead of a stirred autoclave. Aqueous nitric acid from make-up tank 13 and the oil phase comprising cyclohexane dissolved in nitrocyclohexane from make-up tank 14 are delivered under pressure to a jet-mixer 15 in a preheating zone 16, following which the mixture enters a tubular reactor 17 immersed in a heat-transfer fluid in the reaction zone 18. The reaction mixture is then passed through a cooler 19 and/or quenched by injection of water at 20 whereupon it enters a separator 21 where the lighter oil phase 22 separates above the heavier aqueous phase 23 which contains the adipic acid produced. Off-gas leaves the separator by line 24 and is passed to a nitrogen oxides recovery system (not shown) and fume abater (not shown). The upper (oil) phase 22 comprising unreacted cyclohexane dissolved in nitrocyclohexane is circulated back to the reactor through line 25. The aqueous phase 23 containing the dibasic acids is drawn from the bottom of separator 21 through line 26 and passed to a bleacher 27 where NO and $NO_2$ are stripped off by means of air injection 27a. The gases are passed 29 through condenser and separator 63, from which the noncondensed gases are conducted through line 24a to the nitrogen oxides recovery system (not shown). The condensed $NO_2$ is recycled through line 29b to the reactor along with the oil phase. The aqueous phase is passed from the bleacher to a concentrating still 28. The tails from concentrating still 28 are passed through line 30 to a crystallizer 31 where the adipic acid crystallizes and is separated from the aqueous mother liquor. The crude, wet adipic acid is passed 32 to a conventional refining system (not shown). The aqueous nitric acid mother liquor is recycled through line 33 to the reactor. The concentrating still make consists of water and nitrocyclohexane which are condensed and passed from the top of the still to separator 34, separated into an upper, aqueous phase 36 and a lower, nitrocyclohexane oil phase 35. The nitrocyclohexane is recycled 37 to the reactor while the aqueous phase is passed by line 37a partly to cool the exit stream from the reactor at 20 and partly to a steam stripper (not shown) via line 62a for recovery of organics. A small purge may be taken as required from the recirculating oil phase in line 37 and from the aqueous nitric acid acid phase recirculating through 33.

A third and particularly preferred method for carrying out the process of this invention, which permits essentially 100% conversion of cyclohexane per pass and surprisingly high productivity is illustrated by FIGURE III. In this modification of the process the aqueous phase is continuously decanted inside the reactor and only the aqueous phase is withdrawn from the reactor.

In FIGURE III, the nitric acid feed containing the catalyst is made up and fed from tank 39 and the solution of cyclohexane in nitrohydrocarbon is made up and fed from tank 38 to a stirred autoclave reactor 40 to which is attached a baffled tail-pipe section 41 in which no agitation occurs. This allows a portion of the aqueous phase 42 containing the dibasic acids in solution and some dissolved nitrocyclohexane to separate from the mixture of oil and aqueous phases 60 in the upper, stirred portion of the autoclave. The autoclave is fitted with a condenser 58 and off-gas removal line 59; condensate is recycled to the autoclave through line 58a. Only aqueous phase is drawn off from the bottom of the reactor through line 43. This aqueous phase is passed to a bleacher 44, into which air is passed through line 45 to remove nitrogen oxides through line 46 for recovery. The bleached aqueous phase is passed through line 47 to still 48 for concentration. Water and nitrocyclohexane are taken off overhead through line 49 and condensed and passed to separator 50 where the nitrocyclohexane 52 is separated as the lower layer from the water 51 which forms the upper layer and recycled through line 53 back to the reactor. The water is passed via line 62 to a steam stripper (not shown) for recovery of organic material. The concentrator still tails are passed through line 54 to a crystallizer 55 where the stream is cooled, the adipic acid crystallized, filtered, and the cake removed 56. The aqueous nitric acid mother liquor is recycled through line 57 with purge taken as needed at 61 to remove glutaric and succinic acids.

The process for the oxidation of cyclohexane may be carried out under pressures in the range of 40–1000 p.s.i.g., but preferably 100–600 p.s.i.g. The danger of explosion from the nitrogen oxides in the atmosphere above the reacting mixture can be reduced by blowing with nitrogen and also by incorporation of some molecular oxygen or air into the reactor to convert NO to $NO_2$, since it has been found that under these circumstances, reaction of the $NO_2$ with water to form $HNO_3$ results in a reduction in the total amount of nitrogen oxides. The process of this invention can be carried out over temperatures in the range of 75°–130° with 90–110° C. optimum for obtaining maximum conversion and yield of adipic acid. In order to obtain practical rates at lower temperatures, pressures above 300 p.s.i.g. are desirable. When carried out under the optimum conditions of the improvement of this invention, the loss of nitric acid to non-recoverable nitrogen and $N_2O$ and dinitrocyclohexanes is the order of 0.6 to 0.8 pound of $HNO_3$ per pound of adipic acid produced, which is substantially less than is lost in the oxidation of cyclohexanol and cyclohexanone with nitric acid under conditions of the prior art.

One aspect of the present invention has been the discovery that the solubility of nitric acid in mixtures of nitrocyclohexane and cyclohexane increases with increasing nitric acid strength and with increasing ratios of nitrocyclohexane to cyclohexane. Thus, it has been shown that less than 0.1% $HNO_3$ is soluble in cyclohexane in contact with 50% $HNO_3$, while 11% $HNO_3$ is soluble in a 60 to 40 mixture of cyclohexane and nitrocyclohexane in contact with 70% aqueous $HNO_3$.

Within the pressure range employed in the process of this invention, it has been found that productivity can be increased as the pressure is increased, and that increased conversion of the cyclohexane accompanies this increase in productivity.

While it is usually desirable to operate the process of this invention so that no net nitrocyclohexane is prepared, it is possible to modify the conditions slightly to prepare both adipic acid and nitrocyclohexane by the process of this invention when, for example, it is desired to obtain nitrocyclohexane for hydrogenation to cyclohexanone oxime for subsequent conversion to caprolactam. It has been found that it is very easy to control the reaction so as either to produce only adipic acid or to produce some nitrocyclohexane in addition to the adipic acid where this is desired, and still achieve a very high combined yield, of the order of 85–92%. Three factors control the ratio of nitrocyclohexane to adipic acid which may be formed in this reaction; one of these is the molar ratio of $HNO_3$ and/or $NO_2$ to cyclohexane. Others are the ratio of organic nitro-solvent (e.g. nitrocyclohexane) to cyclohexane in the oil phase during the reaction, and nitric acid concentration in the aqueous phase. Increasing the molar ratio of $HNO_3$ and $NO_2$ to cyclohexane favors increased production of adipic acid and decreased production of nitrocyclohexane. Likewise, increasing the concentration of organic nitro-compound solvent employed with the cyclohexane in this oxidation favors the production of increased adipic acid relative to nitrocyclohexane. As can be seen from the examples, low nitric acid concentration favors production of nitrocyclohexane.

As an example of one set of conditions which will produce no net nitrocyclohexane, according to the process of this invention, the reactor, FIGURE I, was operated at 110° C. and 200 p.s.i.g. pressure with, at steady state, a $HNO_3$ to cyclohexane ratio of 7.3 on a molar basis and a residence time of 16 minutes with the oil phase consisting essentially of 60% nitrocyclohexane and 40% cyclohexane (organics basis); a space-time conversion of cyclohexane of 178 g./liter/hr. or 31% conversion was achieved, with no net nitrocyclohexane produced and with adipic acid constituting 84 mol percent of the products obtained. The consumption of nitric acid as represented by $N_2O$, $N_2$, and dinitrocyclohexane was 0.7 g. per gram of adipic acid produced. The by-products, in addition to dinitrocyclohexane, consisted principally of glutaric and succinic acid. In contrast to this, when the oxidation was carried on in a similar, continuous fashion in the reactor (FIGURE I) at 110° C. under 100 p.s.i.g., but employing only 0.1 mole of $HNO_3$ per mole of cyclohexane at steady state, a 48% yield of nitrocyclohexane and 44% yield of adipic acid were obtained, or 92% total yield. During this reaction, the concentration of nitric acid in the aqueous phase was 43% (total basis) and, of the dibasic acids formed, 86% was adipic acid. In a similar experiment, reducing the concentration of the $HNO_3$ in the aqueous nitric acid to 30%, only 72% of the dibasic acids formed was adipic acid.

When producing adipic acid under the conditions of this invention, it has been found that the organic phase usually comprises a solution of cyclohexane in nitrocyclohexane with 2-20% 1,1-dinitrocyclohexane, saturated with nitric acid (about 10%) and $NO_2$ or $N_2O_4$ (about 10%) while the aqueous phase is 40-50% nitric acid with 1-5% dissolved organic material in it other than the dibasic acid products. By varying the relative volumes of the two phases and observing the total rate of conversion of cyclohexane, which is the sum of the rates in the organic and aqueous phases, a space-time conversion in each liquid phase was calculated. From a series of experiments at 110° C. and 100 p.s.i.g., it was demonstrated that the space-time conversion in g./liter/hour in the organic phase averages twenty times the space-time conversion in the aqueous phase. Since the space-time conversion is controlled by the rate-determining step, this latter rate-determining step must occur predominantly in the organic phase when operating under the conditions of this invention, in contrast to the conditions of prior art nitric acid oxidation of cyclohexane where, because of the extremely low solubility of nitric acid in cyclohexane, more of the oxidation occurs either in the aqueous phase or at the interface between the aqueous and the organic phases.

In the continuous operation, it is preferable to extract residual cyclohexane from the aqueous layer with nitrocyclohexane, which can be obtained by batch distillation of a portion of the upper layer which may be done in order to purge the dinitrocyclohexane formed. The nitric acid can be removed from the upper layer by washing with water prior to distillation.

The following examples are intended to illustrate but not to limit the invention and to show conclusively the unexpected improvements achieved by the process of this invention over the processes of the prior art. Whenever the term "aqueous basis" is used herein in reporting the concentration of $HNO_3$ this refers to the weight of $HNO_3$ divided by the sum of the weights of $HNO_3$ and $H_2O$; this ratio is multiplied by 100 to give weight percent. Whenever used herein the term "oil phase" refers to an organic phase comprising cyclohexane plus any nitro-organic solvent. The term "on an organics basis," whenever used herein, refers to the weight of one organic component of the oil phase divided by the total weight of organic compounds in the oil phase; this ratio is multiplied by 100 to obtain weight percent.

Examples 1-38 (except Example 11) were run at temperatures in the range of 100°-120° C. and illustrate the effects of process variables on the yield of adipic acid obtained from cyclohexane upon oxidation with aqueous $HNO_3$. Following Example 38, the process conditions and results are summarized by grouping of illustrative examples in Table 1. In these examples, cyclohexane may be referred to as "CH," nitrocyclohexane as "NCH," and dinitrocyclohexane as "DNCH." Dibasic acids may be referred to as "DBA."

Unless otherwise indicated, the general procedure followed in these examples was as follows:

In brief, the reactor system was flushed with helium prior to the primary charge which normally consisted of 100-600 grams of aqueous nitric acid and 30-300 grams of cyclohexane or a solution of cyclohexane and nitrocyclohexane. The combined nitric acid and cyclohexane *primary charge* to the reactor was usually 300-600 cc. After the primary charge, the reactor and the two phases were agitated and heated to the desired operating temperature and the pressure allowed to reach the desired operating pressure. This normally required 30-40 minutes. After the desired operating conditions were reached, nitric acid and the cyclohexane feed were pumped into the reactor at a constant rate. Simultaneously, the products were removed from the autoclave. In this manner, the liquid level in the reactor was maintained at a fixed value, e.g. 500 cc. The reaction time or holdup time was a function of pumping rate.

Normally, several (3-4) holdup volumes were pumped through the reactor at the desired temperature and pressure to attain steady state conditions. After equilibrium was reached, the products were collected separately from the lining out portion of the run and the experiment continued until an additional 1000 cc. of reactants were pumped through the reactor. This steady state portion of the run is referred to in the tables following Example 38 as the secondary charging period. The corresponding products and results refer only to the secondary charge in these cases; the primary charge is omitted in these instances.

In about half the runs the lining out and steady state portions were combined, and the results and products refer to the combined primary and secondary charge in these examples. In these examples, the primary charge refers again to initial material added to the reactor prior to heating, while the secondary charge in this case corresponds to all material pumped through the reactor after operating temperature and pressure were reached.

The two different types of experiments (i.e., steady state sampling and total sampling) may be differentiated in the table by the presence or absence of a primary charge.

The figure listed in the table for "total nitrocyclohexane" under the heading "Products exit reactor" corresponds to the total weight of NCH in the material leaving the reactor during the sampling period. In order to obtain the net NCH produced, the weight of NCH charged to the reactor should be subtracted from this total. Yield of NCH was calculated for this net value, based on the total quantity of cyclohexane converted.

*Purpose of Examples 1-6.*—To show the effect of nitric acid concentration in the aqueous phase and the ratio of HNO₃/cyclohexane on yield of adipic acid and nitrocyclohexane (NCH).

EXAMPLE 1

To the stirred reactor in FIGURE 1 were charged 140 g. of 70 wt. percent nitric acid containing 0.3% copper and 0.1% vanadium catalysts and 247 g. of a solution of nitrocyclohexane (21 wt. percent) in cyclohexane (79 wt. percent). The mixture was heated to the desired reaction temperature of 110° C. and agitated for a period equal to the nominal residence time during subsequent continuous operation, while allowing the pressure to increase autogenously to the desired operating pressure of 125 p.s.i.g. Then over a 60-minute period were delivered 224 g. of the nitric acid and 441 g. of the nitrocyclohexane solution, while maintaining the liquid level in the reactor constant by bleeding off the mixture of the two liquid phases. The nominal residence time was thus 33 minutes. Pressure was held constant by bleeding off gas. Under these conditons, the nitric acid concentration in the aqueous phase was 30 wt. percent, and the oil phase contained 32 wt. percent nitrocyclohexane on an organics basis.

The liquid stream exit the reactor plus that remaining in the reactor on termination of the experiment contained 33 g. of adipic acid, 6.4 g. of glutaric acid, 3.5 g. of succinic acid and 192 g. of nitrocyclohexane distributed between the two liquid phases according to their solubilities. Small amounts of 1,1- and 1,2-dinitrocyclohexane were also present, bringing the total cyclohexane converted to 58 g., or 10.7%, of which 32% appeared as adipic acid and 55% appeared as nitrocyclohexane.

EXAMPLE 2

To the stirred reactor in FIGURE 1, while operating at the steady state conditions of the experiment, were delivered over a 60-minute period 641 g. of 69% (wt.) nitric acid and 483 g. of a solution of nitrocyclohexane (22 wt. percent) in cyclohexane (78 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 20 minutes. The pressure was maintained at 150 p.s.i.g. by bleeding off gas. The temperature was constant at 110° C. Under these conditons the nitric acid concentration in the aqueous phase was 35 wt. percent, and the oil phase contained 39 wt. percent nitrocyclohexane on an organics basis.

The liquid stream exit the reactor during this period contained 87 g. of adipic acid, 8.2 g. of glutaric acid, 3.1 g. of succinic acid and 183 g. of nitrocyclohexane distributed between the two liquid phases according to their solubilities. Small amounts of 1,1- and 1,2-dinitrocyclohexane were also present, bringing the total cyclohexane converted to 114 g., or 30%, of which 44% appeared as adipic acid and 44% appeared as nitrocyclohexane.

NOTE.—It was observed that small differences in pressure and residence time served to influence conversion only slightly and had little effect on the distribution of products.

EXAMPLE 3

To the stirred reactor in FIGURE 1 were charged 211 g. of 70 wt. percent nitric acid and 164 g. of a solution of nitrocyclohexane (20 wt. percent) in cyclohexane (80 wt. percent). The mixture was heated to the desired reaction temperature of 110° C. and agitated for a period equal to the nominal residence time during subsequent continuous operation, while allowing the pressure to increase autogenously to the desired operating pressure of 100 p.s.i.g. Then over a 150-minute period were delivered 1130 g. of the nitric acid and 875 g. of the nitrocyclohexane solution, while maintaining the liquid level in the reactor constant by bleeding off the mixture of the two liquid phases. The nominal residence time was thus 27 minutes. Pressure was held constant by bleeding off gas. Under these conditions, the nitric acid concentration in the aqueous phase was 40 wt. percent, and the oil phase contained 35 wt. percent nitrocyclohexane on an organics basis.

The liquid stream exit the reactor plus that remaining in the reactor on termination of the experiment contained 149 g. of adipic acid, 29.3 g. of glutaric acid, 27.8 g. of succinic acid and 318 g. of nitrocyclohexane distributed between the two liquid phases according to their solubilities. Small amounts of 1,1- and 1,2-dinitrocyclohexane were also present, bringing the total cyclohexane converted to 208 g., or 25.7%, of which 41% appeared as adipic acid and 34% appeared as nitrocyclohexane. The absence of catalyst in this experiment can be seen clearly from the results. Without copper and vanadium the dibasic acids produced in this example contained only 69% adipic acid, whereas in their presence more than 80% is ordinarily obtained (see Example 6). These materials have very little effect on the relative yield of nitrocyclohexane, however.

EXAMPLE 4

To the stirred reactor in FIGURE 1, while operating at the steady state conditions of the experiment, were delivered over a 120-minute period 1480 g. of 67% (wt.) nitric acid and 453 g. of a solution of nitrocyclohexane (25 wt. percent) in cyclohexane (75 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 27 minutes. The pressure was maintained at 100 p.s.i.g. by bleeding off gas. The temperature was constant at 110° C. Under these conditions the nitric acid concentration in the aqueous phase was 52%, and the oil phase contained 39.6 wt. percent nitrocyclohexane on an organics basis.

The liquid stream exit the reactor during this period contained 103 g. of adipic acid, 11.0 g. of glutaric acid, 5.7 g. of succinic acid and 140 g. of nitrocyclohexane distributed between the two liquid phases according to their solubilities. Small amounts of 1,1- and 1,2-dinitrocyclohexane were also present, bringing the total cyclohexane converted to 91.8 g., or 27%, of which 65% appeared as adipic acid and 19% appeared as nitrocyclohexane.

EXAMPLE 5

To the stirred reactor in FIGURE 1 were charged 364 g. of 67 wt. percent nitric acid containing 0.3% copper and 0.1% vanadium catalysts and 108 g. of a solution of nitrocyclohexane (25 wt. percent) in cyclohexane (75 wt. percent). The mixture was heated to the desired reaction temperature of 110° C. and agitated for a period equal to the nominal residence time during subsequent continuous operation, while allowing the pressure to increase autogenously to the desired operating pressure of 50 p.s.i.g. Then over a 105-minute period were delivered 1060 g. of the nitric acid and 300 g. of the nitrocyclohexane solution, while maintaining the liquid level in the reactor constant by bleeding off the mixture of the two liquid phases. The nominal residence time was thus 27 minutes. Pressure was held constant by bleeding off gas. Under these conditions, the nitric acid concentration in the aqueous phase was 59 wt. percent, and the oil phase contained 28 wt. percent nitrocyclohexane on an organics basis.

The liquid stream exit the reactor plus that remaining in the reactor on termination of the experiment contained 43.5 g. of adipic acid, 4.16 g. of glutaric acid, 2.72 g. of succinic acid and 106.4 g. of nitrocyclohexane distributed between the two liquid phases according to their solubilities. Small amounts of 1,1- and 1,2-dinitrocyclohexane were also present, bringing the total cyclohexane converted to 32.4 g., or 10.7%, of which 77% appeared as adipic acid and 7% appeared as nitrocyclohexane.

EXAMPLE 6

To the stirred reactor in FIGURE 1, while operating at the steady state conditions of the experiment, were delivered over a 120-minute period 205 g. of 19% (wt.) nitric acid and 427 g. cyclohexane. The nitric acid contained 0.3% copper and 0.1% vanadium as dissolved nitrate and vanadate. The liquid level in the reactor was held constant by bleeding off the mixture of the two liquid phases, resulting in a nominal residence time of 65 minutes. The pressure was maintained at 100 p.s.i.g. by bleeding off gas. The temperature was constant at 125° C. Under these conditions, the nitric acid concentration in the aqueous phase was 6.5 wt. percent, and the oil phase contained 6.9 wt. percent nitrocyclohexane on an organics basis.

The liquid stream exit the reactor during this period contained 5.86 g. of adipic acid, 2.31 g. of glutaric acid, 0.97 g. of succinic acid and 28.6 g. of nitrocyclohexane distributed between the two liquid phases according to their solubilities. Small amounts of 1,1- and 1,2-dinitrocyclohexane were also present, bringing the total cyclohexane converted to 24.7 g., or 5.8%, of which 14% appeared as adipic acid and 75% appeared as nitrocyclohexane. When compared to the other examples pertaining to the effect of the variables on product distribution, it is clear that when the $HNO_3$ concentration is low and is present as a low $HNO_3$/cyclohexane ratio, and when the NCH concentration in the oil phase is low, the yield to adipic acid is at minimum.

*Purpose of Examples 3, 7, 8, 20, 23, 24, 37.*—To show the catalytic effect of copper and vanadium salts in improving the distribution of dibasic acids to give higher concentrations of adipic acid in the presence of these materials.

EXAMPLE 7

To the stirred reactor in FIGURE 1 were charged 211 g. of 68 wt. percent nitric acid containing 0.3% copper and 0.1% vanadium catalysts and 165 g. of a solution of nitrocyclohexane (21.5 wt. percent) in cyclohexane (78.5 wt. percent). The mixture was heated to the desired reaction temperature of 110° C. and agitated for a period equal to the nominal residence time during subsequent continuous operation, while allowing the pressure to increase autogenously to the desired operating pressure of 100 p.s.i.g. Then over a 150-minute period were delivered 1340 g. of the nitric acid and 943 g. of the nitrocyclohexane solution, while maintaining the liquid level in the reactor constant by bleeding off the mixture of the two liquid phases. The nominal residence time was thus 25 minutes. Pressure was held constant by bleeding off gas. Under these conditions, the nitric acid concentration in the aqueous phase was 37 wt. percent, and the oil phase contained 37 wt. percent nitrocyclohexane on an organics basis.

The liquid stream exit the reactor plus that remaining in the reactor on termination of the experiment contained 266 g. of adipic acid, 27.6 g. of glutaric acid, 13.6 g. of succinic acid, and 325 g. of nitrocyclohexane distributed between the two liquid phases according to their solubilities. Small amounts of 1,1- and 1,2-dinitrocyclohexane were also present, bringing the total cyclohexane converted to 252 g., or 30%, of which 61% appeared as adipic acid and 23% appeared as nitrocyclohexane. Adipic acid thus constituted 85 mole percent of the dibasic acids produced.

EXAMPLE 8

To the stirred reactor in FIGURE 1 were charged 225 g. of 68 wt. percent nitric acid containing 0.1% vanadium catalyst and 192 g. of a solution of nitrocyclohexane (21 wt. percent) in cyclohexane (79 wt. percent). The mixture was heated to the desired reaction temperature of 110° C. and agitated for a period equal to the nominal residence time during subsequent continuous operation, while allowing the pressure to increase autogenously to the desired operating pressure of 100 p.s.i.g. Then over a 180-minute period were delivered 1635 g. of the nitric acid and 1135 g. of the nitrocyclohexane solution, while maintaining the liquid level in the reactor constant by bleeding off the mixture of the two liquid phases. The nominal residence time was thus 25 minutes. Pressure was held constant by bleeding off gas. Under these conditions, the nitric acid concentration in the aqueous phase was 41 wt. percent, and the oil phase contained 36 wt. percent nitrocyclohexane on an organics basis.

The liqiud stream exit the reactor plus that remaining in the reactor on termination of the experiment contained 285 g. of adipic acid, 26.9 g. of glutaric acid, 13.3 g. of succinic acid and 370 g. of nitrocyclohexane distributed between the two liquid phases according to their solubilities. Small amounts of 1,1- and 1,2-dinitrocyclohexane were also present, bringing the total cyclohexane converted to 262 g. or 25%, of which 62% appeared as adipic acid and 22% appeared as nitrocyclohexane. Adipic acid in this case constituted 86 mole percent of the dibasic acids; hence it appears that it is the vanadium which functions to improve the dibasic acid distribution in favor of adipic acid.

EXAMPLE 37

To the stirred reactor in FIGURE 1 were charged 212 g. of 68 wt. percent nitric acid containing 0.3% copper catalyst and 182 g. of a solution of nitrocyclohexane (22 wt. percent) in cyclohexane (78 wt. percent). The mixture was heated to the desired reaction temperature of 110° C. and agitated for a period equal to the nominal residence time during subsequent continuous operation, while allowing the pressure to increase autogenously to the desired operating pressure of 100 p.s.i.g. Then over a 165-minute period were delivered 1325 g. of the nitric acid and 1188 g. of the nitrocyclohexane solution, while maintaining the liquid level in the reactor constant by bleeding off the mixture of the two liquid phases. The nominal residence time was thus 26 minutes. Pressure was held constant by bleeding off gas. Under these conditions, the nitric acid concentration in the aqueous phase was 40 wt. percent, and the oil phase constained 32 wt. percent nitrocyclohexane on an organics basis.

The liquid stream exit the reactor plus that remaining in the reactor on termination of the experiment contained 175 g. of adipic acid, 31.1 g. of glutaric acid, 25.4 g. of succinic acid and 398 g. of nitrocyclohexane distributed between the two liquid phases according to their solubilities. Small amounts of 1,1- and 1,2-dinitrocyclohexane were also present, bringing the total cyclohexane converted to 210 g. or 20%, of which 46% appeared as adipic acid and 32% appeared as nitrocyclohexane. Adipic acid constituted 73% of the dibasic acids produced.

*Purpose of Examples 4, 9 and 10.*—To show that oxygen may be injected into the reaction mixture thereby effecting a marked decrease in the quantity of NO and $NO_2$ escaping in the off-gas relative to the production of adipic acid without any harmful effect on the process.

EXAMPLE 9

To the stirred reactor in FIGURE 1, while operating at the steady state conditions of the experiment, were delivered over a 120-minute period of 720 g. of 69% (wt.) nitric acid and 197 g. of a solution of nitrocyclohexane (25 wt. percent) in cyclohexane (75 wt. percent). The nitric acid contained 0.3% copper and 0.1% vanadium as dissolved nitrate and vanadate. Into the reacting mixture was also delivered 0.49 mole of oxygen over this period. The liquid level in the reactor was held constant by bleeding off the mixture of the two liquid phases, resulting in a nominal residence time of 60 minutes. The pressure was maintained at 100 p.s.i.g. by bleeding off gas. The temperature was constant at 110° C. Under these conditions the nitric acid concentration in the aqueous phase was 54 wt. percent, and the oil phase contained 41 wt. percent nitrocyclohexane on an organics basis.

The liquid stream exit the reactor during this period contained 62.3 g. of adipic acid, 6.83 g. of glutaric acid, 4.16 of succinic acid and 60.3 g. of nitrocyclohexane distributed between the two liquid phases according to their solubilities. Small amounts of 1,1- and 1,2-dinitrocyclohexane were also present, bringing the total cyclohexane converted to 52.5 g., or 36%, of which 68% appeared as adipic acid and 15% appeared as nitrocyclohexane. The off-gas in this experiment contained the equivalent of 6.50 g. of $HNO_3$ as $NO+NO_2$, or 0.105 g./g. of adipic acid produced. In Example 4, an experiment under similar conditions at shorter residence time, the off-gas contained 1.19 g. $HNO_3$ as $NO+NO_2$ per g. of adipic acid produced.

*Purpose of Examples 10, 12, 13, 14.*—To show that the yield of adipic acid is directly proportional to concentration of nitrocyclohexane in the oil phase of the reaction mixture.

EXAMPLE 10

To the stirred reactor in FIGURE 1, while operating at the steady state conditions of the experiment, were delivered over a 120-minute period 1330 g. of 69% (wt.) nitric acid and 375 g. of cyclohexane. The nitric acid contained 0.3% copper and 0.1% vanadium as dissolved nitrate and vanadate. The liquid level in the reactor was held constant by bleeding off the mixture of the two liquid phases, resulting in a nominal residence time of 30.5 minutes. The pressure was maintained at 100 p.s.i.g. by bleeding off gas. The temperature was constant at 110° C. Under these conditions the nitric acid concentration in the aqueous phase was 55 wt. percent, and the oil phase contained 17 wt. percent nitrocyclohexane on an organics basis.

The liquid stream exit the reactor during this period contained 87.2 g. of adipic acid, 8.88 g. of glutaric acid, 4.16 g. of succinic acid and 56.4 g. of nitrocyclohexane distributed between the two liquid phases according to their solubilities. Small amounts of 1,1- and 1,2-dinitrocyclohexane were also present, bringing the total cyclohexane converted to 99.4 g., or 26.5%, of which 50.5% appeared as adipic acid and 37% appeared as nitrocyclohexane. The off-gas contained the equivalent of 79.8 g. of $MNO_3$ as $NO+NO_2$, or 0.91 g. $HNO_3$/g. of adipic acid produced.

EXAMPLE 12

To the stirred reactor in FIGURE 1, while operating at the steady state conditions of the experiment, were delivered over a 90-minute period 1225 g. of 61% (wt.) nitric acid and 147 g. cyclohexane. The nitric acid contained 0.3% copper and 0.1% vanadium as dissolved nitrate and vanadate. The liquid level in the reactor was held constant by bleeding off the mixture of the two liquid phases, resulting in a nominal residence time of 30 minutes. The pressure was maintained at 350 p.s.i.g. by bleeding off gas. The temperature was constant at 110° C. Under these conditions the nitric acid concentration in the aqueous phase was 49 wt. percent, and the oil phase contained 25 wt. percent nitrocyclohexane on an organics basis.

The liquid stream exit the reactor during this period contained 63.8 g. of adipic acid, 6.19 g. of glutaric acid, 3.09 g. of succinic acid and 33.9 g. of nitrocyclohexane distributed between the two liquid phases according to their solubilities. Small amounts of 1,1- and 1,2-dinitrocyclohexane were also present, bringing the total cyclohexane converted to 67 g., or 46%, of which 55% appeared as adipic acid and 33% appeared as nitrocyclohexane.

EXAMPLE 13

To the stirred reactor in FIGURE 1 was charged 433 g. of 58 wt. percent nitric acid containing 0.3% copper and 0.1% vanadium catalysts. This was heated to 110° C., then 33.2 g. of cyclohexane was injected in four equal parts over a 30-minute period. The pressure was then reduced to 50 p.s.i.g. (from the maximum 97 p.s.i.g. reached). Then over a 120-minute period were delivered 1692 g. of the nitric acid and 135 g. of cyclohexane, while maintaining the liquid level in the reactor constant by bleeding off the mixture of the two liquid phases. The nominal residence time was thus 31 minutes. Pressure was held constant by bleeding off gas. Under these conditions, the nitric acid concentration in the aqueous phase was 56 wt. percent, and the oil phase contained 4.6 wt. percent nitrocyclohexane on an organics basis.

The liquid stream exit the reactor plus that remaining in the reactor on termination of the experiment contained 12.8 g. of adipic acid, 1.21 g. of glutaric acid, 0.83 g. of succinic acid and 13.58 g. of nitrocyclohexane distributed between the two liquid phases according to their solubilities. Small amounts of 1,1- and 1,2-dinitrocyclohexane were also present, bringing the total cyclohexane converted to 17.8 g. or 11%, of which 41% appeared as adipic acid and 50% appeared as nitrocyclohexane.

EXAMPLE 14

To the stirred reactor in FIGURE 1 were charged 141 g. of 68 wt. percent nitric acid containing 0.1% vanadium catalyst and 324 g. of cyclohexane. The mixture was heated to the desired reaction temperature of 110° C. and agitated for a period equal to the nominal residence time during subsequent continuous operation, while allowing the pressure to incrase autogenously to the desired operating pressure of 100 p.s.i.g. Then over a 128-minute period were delivered 739 g. of the nitric acid and 3576 g. of cyclohexane, while maintaining the liquid level in the reactor constant by bleeding off the mixture of the two liquid phases. The nominal residence time was thus 10 minutes. Pressure was held constant by bleeding off gas. Under these conditions, the nitric acid concentration in the aqueous phase was 43 wt. percent, and the oil phase contained 3 wt. percent nitrocyclohexane on an organic basis.

The liquid stream exit the reactor plus that remaining in the reactor on termination of the experiment contained 125 g. of adipic acid, 12.6 g. of glutaric acid, 5.6 g. of succinic acid and 108 g. of nitrocyclohexane distributed between the two liquid phases according to their solubilities. Small amounts of 1,1- and 1,2-dinitrocyclohexane were also present, bringing the total cyclohexane converted to 162 g., or 4%, of which 46% appeared as adipic acid and 45% appeared as nitrocyclohexane.

EXAMPLE 11

*Purpose of Example 11: demonstration of the oxidation of cyclododecane.*—Five hundred thirty six grams (536 g.) of a solution of nitrocyclododecane (48% by weight) in cyclododecane was added to 237 g. of 40% nitric acid containing 15 g. of ammonium vanadate contained in a stirred autoclave. After pressuring to 200 lbs. with nitrogen and heating to 120° C., an additional 395 g. of 40% nitric acid was added over a period of 20 minutes while maintaining the reaction temperature at 120° C. The reaction mixture then was cooled to 60° C. and the spent acid separated (490 g., 25.7% $HNO_3$). After further cooling to 25° C., the products were separated into an oil layer (436 g., 49% nitrocyclododecane by weight) and 45.5 g. of 1,12-dodecanedioic acid.

After addition of 45 g. of cyclododecane, the oil layer separated as described above was recycled under the same conditions to the nitric acid oxidation step. The product was an oil (485.7 g., 52% nitrocyclododecane) and 37 g. of 1,12-dodecanedioic acid.

Again the oil layer (from the first recycle described above) (485.7 g.) plus 63 g. of cyclododecane was recycled under the same oxidation conditions. An oil (454.1 g., 53% nitrocyclododecane) and 42.4 g. of 1,12-dodecanedioic acid were obtained.

The average conversion and yield over the three runs were 23% conversion of cyclododecane with a yield of 53% dodecanedioic acid. In the presence of more than 50% by weight nitrocyclododecane the net yield of nitrocyclododecane from cyclododecane was essentially zero. The yield can be greatly improved by use of higher proportions of a nitrohydrocarbon solvent other than nitrocyclododecane, particularly nitrocyclohexane or nitrobenzene. These alternative solvents are more resistant to attack by aqueous nitric acid than is nitrocyclododecane. Furthermore, unlike nitrocyclohexane, nitrocyclododecane does not produce the dicarboxylic acid upon oxidation. Therefore, in preferred operation in the internal decanter of FIGURE III, a low concentration of cyclododecane (3–10%) in a different nitrohydrocarbon solvent (e.g. nitrocyclohexane) gives optimum yields of the dodecanedioic acid.

*Purpose of Examples 15–34.*—To illustrate the conditions used to obtain high yields of adipic acid ($\geq 78\%$) and low yields of nitration products ($<10\%$).

The range of process variables in Examples 15 through 34 are listed below:

Temperature, C. _____ 100–120
Pressure, p.s.i.g. _____ 48–350
Reaction time, minutes _____ 9–58
Nitric acid concentration under reacting conditions, wt. percent total basis _____ 40–60
Volume feed ratio of aqueous to oil phases ____ 0.4–10
Moles HNO$_3$ feed/moles CH feed _____ 1.9–20
Moles HNO$_3$/mole CH at steady state _____ 1–60
Steady state concentration of nitrocyclohexane in the oil phase, percent _____ 41–78
Steady state cyclohexane concentration in the oil phase, percent _____ 59–22
Vanadium concentration in nitric acid feed, wt. percent _____ 0.06–0.5
Copper concentration in nitric acid feed, wt. percent _____ 0–0.5

Example 24 with the nitrocyclohexane solvent labelled with C$^{14}$ and Example 34 with cyclohexane labelled with C$^{14}$ are experiments which prove that nitrocyclohexane solvent decreases the formation of nitration products compare to oxidation products, i.e. dibasic acids. Compare these examples with 10, 12, 13 and 14. In Examples 10 and 13, the ratio of nitrocyclohexane to adipic acid was 0.9 and 1.2, respectively. Substantiating evidence that nitro compounds in general decrease nitration products is given in Examples 27 and 35 where the ratio of nitration products, i.e. nitrocyclohexane and dinitrocyclohexane, to oxidation products, i.e. dibasic acids, was 0.3–0.4. Compare these with 10 and 13.

Examples 25 and 26 illustrate that steady state is quickly established in these experiments. The composite products distribution in a given run is essentially the same as that obtained during the steady state or latter portion of the run. In some examples the data for the total run are given and in others the steady state portion is given.

EXAMPLE 15

After the reactor and separator were flushed with helium, 150 cc. (210 g.) of 70% HNO$_3$ containing 0.06% vanadium (as vanadate) were pumped into the reactor. 300 cc. (280 g.) of an oil phase containing 33% cyclohexane and 67% nitrocyclohexane were added. The reactor and contents were heated to 110° C. in 30 minutes and this temperature maintained until the pressure reached 70 p.s.i.g. At this time the nitric acid feed and the oil feed were pumped into the reactor at the rate of 2.0 cc./min. and 4.6 cc./min., respectively. Throughout the experiment the temperature was controlled at 110° C. and the pressure maintained at 70 p.s.i.g. by removing continuously both liquid and gas phases. After a total of 630 cc. of nitric acid and 1423 cc. of oil phase were pumped into or through the reactor, the run was terminated (4 hours). The products (liquid and gaseous) were collected and measured. The average reaction time in the reactor was 30 minutes and the composition of the nitric acid phase during steady state was about 40% HNO$_3$, 15% DBA. The oil phase contained on an organic basis 74% NCH, 26% cyclohexane. The products obtained which were associated with the above feed were 131 grams of adipic acid, 15.2 grams of glutaric acid, 11.0 grams of succinic acid. 892 grams of nitrocyclohexane were put through the reactor and essentially the same weight of NCH was recovered, i.e., no net NCH was produced. The total cyclohexane converted was 93 grams or 21%. The respective yields are 81% adipic, 0% nitrocyclohexane. The gaseous products were largely N$_2$, N$_2$O, NO, NO$_2$ and CO$_2$.

EXAMPLE 16

To the stirred reactor in FIGURE 1, while operating at the steady state conditions of the experiment, were delivered over a 90-minute period 1010 g. of 68% (wt.) nitric acid and 314 g. of a solution of nitrocyclohexane (50 wt. percent) in cyclohexane (50 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 31 minutes. The pressure was maintained at 200 p.s.i.g. by bleeding off gas. The temperature was constant at 110° C. Under these conditions the nitric acid concentration in the aqueous phase was 49 wt. percent, and the oil phase contained 65.5 wt. percent nitrocyclohexane on an organics basis.

The liquid stream exit the reactor during this period contained 94.4 g. of adipic acid, 9.4 g. of glutaric acid, 4.6 g. of succinic acid and 152 g. of nitrocyclohexane distributed between the two liquid phases according to their solubilities. Small amounts of 1,1- and 1,2-dinitrocyclohexane were also present, bringing the total cyclohexane converted to 65 g., or 42%, of which 83% appeared as adipic acid and 0% appeared as nitrocyclohexane.

EXAMPLE 17

To the stirred reactor in FIGURE 1, while operating at the steady state conditions of the experiment, were delivered over a 120-minute period 1356 g. of 68% (wt.) nitric acid and 428 g. of a solution of nitrocyclohexane (50 wt. percent) in cyclohexane (50 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 33 min. The pressure was maintained at 350 p.s.i.g. by bleeding off gas. The acid concentration in the aqueous phase was 54 wt. percent, and the oil phase contained 60 wt. percent nitrocyclohexane on an organics basis.

The liquid stream exit the reactor during this period contained 95.5 g. of adipic acid, 8.2 g. of glutaric acid, 3.4 g. of succinic acid and 218 g. of nitrocyclohexane (2.9 g. net) distributed between the two liquid phases according to their solubilities. Small amounts of 1,1- and 1,2-dininitrocyclohexane were also present, bringing the total cyclohexane converted to 67 g., or 31%, of which 83% appeared as adipic acid and 3% appeared as nitrocyclohexane.

EXAMPLE 18

To the stirred reactor in FIGURE 1, while operating at the steady state conditions of the experiment, were delivered over a 30-minute period 339 g. of 68% (wt.) nitric acid and 110 g. of a solution of nitrocyclohexane (50 wt. percent) in cyclohexane (50 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 29 minutes. The pressure was maintained at 350 p.s.i.g. by bleeding off gas. The temperature was constant at 100° C. Under these conditions the nitric acid concentration in the aqueous phase was 56 wt. percent, and the oil phase contained 61 wt. percent nitrocyclohexane on an organics basis.

The liquid stream exit the reactor during this period contained 23.9 g. of adipic acid, 2.05 g. of glutaric acid, 0.84 g. of succinic acid and 53 g. of nitrocyclohexane distributed between the two liquid phases according to their solubilities. Since 55 g. of NCH were added, a net loss of 2 grams was observed. Small amounts of 1,1- and 1,2-dinitrocyclohexane were also present, bringing the total cyclohexane converted to 16 g., or 29%, of which 86% appeared as adipic acid and 0% appeared as nitrocyclohexane. The nitric acid converted to $N_2$, $N_2O$ and dinitrocyclohexane was 0.82 gram per gram of adipic acid produced.

EXAMPLE 19

After the reactor and separator were flushed with helium, 354 cc. of 68% $HNO_3$ containing 0.3% dissolved Cu and 0.1% V as vanadate were pumped into the reactor. 36 cc. of an oil phase containing 75% cyclohexane and 25% nitrocyclohexane were added. The reactor and contents were heated to 110° C. in 20 minutes and this temperature maintained until the pressure reached 350 p.s.i.g. At this time the nitric acid feed and the oil feed were pumped into the reactor at the rate of 11 cc./min. and 1.12 cc./min., respectively. Throughout the experiment the temperature was controlled at 110° C. and the pressure maintained at 350 p.s.i.g. by removing continuously both liquid and gas phases. After a total of 989 cc. (1398 grams) of nitric acid and 101 cc. (83.8 grams) of oil phase were pumped into or through the reactor, the run was terminated. At this time the products (liquid and gaseous) were collected and measured. The average reaction time in the reactor was 28 minutes and the composition of the nitric acid phase during steady state was 58% $HNO_3$, 4% DBA, 38% $H_2O$. The oil phase contained on an organics basis 41% NCH, 58% CH, 1% DNCH. The products obtained which were associated with this feed were 49 grams of adipic acid, 6.5 grams of glutaric acid, 2.9 grams of succinic acid, 1.2 grams (net) of nitrocyclohexane, 0.28 grams of dinitrocyclohexane bringing the total cyclohexane converted to 35 grams of 56%. The respective molar yields are 79.8% adipic, 2.3% nitrocyclohexane. The gaseous products were largely $N_2$, $N_2O$, NO, $NO_2$ and $CO_2$. The total $CO_2$ was equivalent to the glutaric and succinic acid produced. Percentages are on a weight basis unless otherwise noted.

EXAMPLE 20

After the reactor and separator were flushed with helium 450 cc. of 54% $HNO_3$ containing 0.5% Cu and 0.5% V as soluble salts were pumped into the reactor. 150 cc. of an oil phase containing 59% cyclohexane and 41% nitrocyclohexane were added. The reactor and contents were heated to 110° C. in 20 minutes and this temperature maintained until the pressure reached 150 p.s.i.g. At this time the nitric acid feed and the oil feed were pumped into the reactor at the rate of 15 cc./min. and 5 cc./min., respectively. The pressure reached 200 p.s.i.g. 5 minutes after pumps started. Throughout the experiment the temperature was controlled at 110° C. and the pressure maintained at 200 p.s.i.g. by removing continuously both liquid and gas phases. After a total of 2410 cc. of nitric acid and 910 cc. of oil phase were pumped into or through the reactor, the experiment was terminated. At this time the products (liquid and gaseous) were collected and measured. The average reaction time in the reactor was 30 minutes and the composition of the nitric acid phase during steady state was 45% $HNO_3$, 5% DBA, 50% $H_2O$. The oil phase contained on an organics basis 48% NCH, 50% CH, 1.6% DNCH. During this run, a total of 2410 cc. of nitric feed and 910 cc. of oil feed were delivered to the reactor. The products obtained which were associated with this feed were 103 grams of adipic acid, 8.3 grams of glutaric acid, 3.7 grams of succinic acid, 0 grams of nitrocyclohexane, 10 grams of dinitrocyclohexane, bringing the total cyclohexane converted to 73 grams or 15.5%. The respective molar yields are 81% adipic, 0% nitrocyclohexane. The gaseous products were largely $N_2$, $N_2O$, NO, $NO_2$ and $CO_2$. The total $CO_2$ was equivalent to the glutaric and succinic acid produced.

EXAMPLE 21

After the reactor and separator were flushed with helium 294 cc. of 68% $HNO_3$ containing 0.3% Cu and 0.1% V as soluble salts were pumped into the reactor. 66 cc. of an oil phase containing 75% cyclohexane and 25% nitrocyclohexane were added. The reactor and contents were heated to 110° C. in 20 minutes and this temperature maintained until the pressure reached 180 p.s.i.g. Helium was added until pressure reached 350 p.s.i.g. At this time the nitric acid feed and the oil feed were pumped into the reactor at the rate of 9.73 cc./min. and 2.24 cc./min., respectively. Throughout the experiment the temperature was controlled at 110° C. and the pressure maintained at 350 p.s.i.g. by removing continuously both liquid and gas phases. After a total of 876 cc. (1238 g.) of nitric acid and 202 cc. (167 g.) of oil phase were pumped into or through the reactor, the run was terminated. At this time the products (liquid and gaseous) were collected and measured. The average reaction time in the reactor was 27 minutes and the composition of the nitric acid phase during steady state as 53% $HNO_3$, 7.9% DBA, 39% $H_2O$. The oil phase contained on an organics basis 48% NCH, 49% CH, 3% DNCH. The products obtained which were associated with this feed were 83.4 grams of adipic acid, 9.3 grams of glutaric acid, 4.1 grams of succinic aicd, 2.8 grams (net) of nitrocyclohexane, 2.5 grams of dinitrocyclohexane, bringing the total cyclohexane converted to 60 grams or 48%. The respective molar yields are 80.2% adipic, 3% nitrocyclohexane (net). The gaseous products were largely $N_2$, $N_2O$, NO, $NO_2$ and $CO_2$. The total $CO_2$ was equivalent to the glutaric and succinic acid produced. Percentages are on a weight basis unless indicated otherwise.

EXAMPLE 22

To the stirred reactor in FIGURE 1, while operating at the steady state conditions of the experiment, were delivered over a 90-minute period 1020 cc. of 68% (wt.) nitric acid and 535 cc. of a solution of nitrocyclohexane (52 wt. percent) in cyclohexane (48 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 30 minutes. The presure was maintained at 200 p.s.i.g. by bleeding off gas. The temperature was constant at 110° C. Under these conditions the nitric acid concentration in the aqueous phase was 47 wt. percent, and the oil phase contained 59 wt. percent nitrocyclohexane on an organics basis.

The liquid stream exit the reactor during this period contained 117 g. of adipic acid, 14 g. of glutaric acid, 5.6 g. of succinic acid and 0 g. of nitrocyclohexane in excess of the NCH added distributed between the two liquid phases according to their solubilities. Small amounts of 1,1- and 1,2-dinitrocyclohexane were also present, bringing the total cyclohexane converted to 82 g., or 35.5%, of which 81% appeared as adipic acid and 0% appeared as nitrocyclohexane.

EXAMPLE 23

After the reactor and separator were flushed with helium 100 cc. of 70% $HNO_3$ containing 0.4% Cu and 0.06% V as soluble salts were pumped into the reactor. 300 cc. of an oil phase containing 25% cyclohexane and 75% nitrocyclohexane were added. The reactor and contents were heated to 110° C. in 20 minutes and this temperature maintained until the pressure reached 48 p.s.i.g At this time the nitric acid feed and the oil feed were pumped into the reactor at the rate of 4 cc./min. and 7 cc./min., respectively. Throughout the experiment the temperature was controlled at 110° C. and the pressure maintained at 48 p.s.i.g. by removing continuously both liquid and gas phases. After a total of 1422 cc. of nitric acid and 2300 cc. of oil phase were pumped into or through the reactor, the run was terminated (5 hours). The products (liquid and gaseous) were collected and measured. The average reaction time in the reactor was 32 minutes and the composition of the nitric acid phase during steady state was 56% $HNO_3$, 10% DBA, 34% $H_2O$. The oil phase contained on an organics basis 80% NCH, 20% CH. The products obtained which were associated with the above feed were 175 grams of adipic acid, 24.4 grams of glutaric acid, 15.5 grams of succinic acid. A slight net loss of nitrocyclohexane was observed. The total cyclohexane converted was 128 grams or 23%. The respective molar yields are 79% adipic, 0% nitrocyclohexane. The gaseous products were largely $N_2$, $N_2O$, NO, $NO_2$ and $CO_2$. The total $CO_2$ was equivalent to the glutaric and succinic acid produced. All percentages are on a weight basis unless otherwise noted.

EXAMPLE 24

To the stirred reactor in FIGURE 1 were charged 540 g. (400 cc.) of 58 wt. percent nitric acid containing 0.3% copper and 0.4% vanadium catalysts and 183 g. (200 cc.) of a solution of nitrocyclohexane (57 wt. percent) in cyclohexane (43 wt. percent). The mixture was heated to the desired reaction temperature of 110° C. and agitated for a period equal to the nominal residence time during subsequent continuous operation, while allowing the pressure to increase autogenously to the desired operating pressure of 200 p.s.i.g. Then over a 120-minute period were delivered 2260 g. of the nitric acid and 803 g. of the nitrocyclohexane solution, while maintaining the liquid level in the reactor constant by bleeding off the mixture of the two liquid phases. The nominal residence time was thus 24 minutes. Pressure was held constant by bleeding off gas. Under these conditions, the nitric acid concentration in the aqueous phase was 47 wt. percent, and the oil phase contained 66 wt. percent nitrocyclohexane on an organics basis.

The liquid stream exit the reactor plus that remaining in the reactor on termination of the experiment contained 170 g. of adipic acid, 14.5 g. of glutaric acid, 7.1 g. of succinic acid and 562 g. of nitrocyclohexane distributed between the two liquid phases according to their solubilities. The net nitrocyclohexane produced was zero. Small amounts of 1,1- and 1,2-dinitrocyclohexane were also present, bringing the total cyclohexane converted to 110 g., or 28%, of which 82% appeared as adipic acid and 0% appeared as nitrocyclohexane.

In this experiment the nitrocyclohexane feed into and through the reacting system contained carbon-14 ($C^{14}$ labelled at random). The molar radioactivity was 896,069 disintegrations per minute (DPM) per mole. The total radioactivity of the adipic acid produced was 145,304 disintegrations per minute. This amount of radioactivity corresponds to 0.1967 moles of nitrocyclohexane $$\left(\frac{.145 \times 10^6 \text{ DPM}}{.896 \times 10^6 \text{ DPM/mole NCH}}\right)$$

Since the recovered cyclohexane was essentially nonradioactive (indicating no $C^{14}$ exchange between nitrocyclohexane and cyclohexane), the radioactivity in the adipic acid was a direct measure of the quantity of nitrocyclohexane converted to adipic acid. A total of 1.16 moles of adipic acid was produced and 0.196 moles or 17% was made by oxidation of the nitrocyclohexane.

EXAMPLE 25

After the reactor and separator were flushed with helium, 400 cc. (540 g.) of 58% $HNO_3$ containing 0.3% Cu and 0.3% V were pumped into the reactor. 200 cc. (185 g.) of an oil phase containing 41% cyclohexane and 59% nitrocyclohexane were added. The reactor and contents were heated to 120° C. in 20 minutes and this temperature maintained until the pressure reached 50 p.s.i.g. At this time the nitric acid feed and the oil feed were pumped into the reactor at the rate of 39 cc./min. and 16.5 cc./min., respectively. Throughout the experiment the temperature was controlled at 120° C. and the pressure maintained at 50 p.s.i.g. by removing continuously both liquid and gas phases. After a total of 1620 cc. of nitric acid and 720 cc. of oil phase were pumped into or through the reactor, steady state conditions were reached. At this time the products (liquid and gaseous) were collected and measured separately from startup portion of the run. The average reaction time in the reactor was 9 minutes and the composition of the nitric acid phase during steady state was 53% $HNO_3$, 1% DBA, 46% $H_2O$. The oil phase contained on an organics basis 63% NCH, 37% CH, 0.2% DNCH. During the steady state portion of the run, a total of 1125 cc. of nitric feed and 480 cc. (443 g.) of oil feed were delivered to the reactor. The net products obtained which were associated with this feed were 14.8 grams of adipic acid, 1.4 grams of glutaric acid, 1.2 grams of succinic acid, 0 grams of nitrocyclohexane, 0.08 grams of dinitrocyclohexane bringing the total cyclohexane converted to 11 grams or 6%. The respective yields are 79% adipic, 0% nitrocyclohexane. The gaseous products were largely $N_2$, $N_2O$, NO, $NO_2$ and $CO_2$. The total $CO_2$ was equivalent to the glutaric and succinic acid produced.

EXAMPLE 26

(*Purge and steady state composite*).—After the reactor and separator were flushed with helium, 400 cc. of 58% $HNO_3$ containing 0.3% Cu and 0.3% V as soluble salts were pumped into the reactor. 200 cc. of an oil phase containing 41% cyclohexane and 59% nitrocyclohexane were added. The reactor and contents were heated to 120° C. in 20 minutes and this temperature maintained until the pressure reached 50 p.s.i.g. At this time the nitric acid feed and the oil feed were pumped into the reactor at the rate of 39 cc./min. and 16.5 cc./min., respectively. Throughout the experiment the temperature was controlled at 120° C. and the pressure maintained at 50 p.s.i.g. by removing continuously both liquid and gas phases. After a total of 2740 cc. of nitric acid and 1200 cc. (1102 g.) of oil phase were pumped into or through the reactor, the run was terminated. The products (liquid and gaseous) were collected and measured. The average reaction time in the reactor was 9 minutes and the composition of the nitric acid phase during steady state was 53% $HNO_3$, 1% DBA, 46% $H_2O$. The oil phase contained on an organics basis 63% NCH, 37% CH, 0.2% DNCH. The net products obtained which were associated with this feed were 45.1 grams of adipic acid, 4.0 grams of glutaric acid, 3.2 grams of succinic acid, 0 grams of nitrocyclohexane, 2.0 grams of dinitrocyclohexane bringing the total cyclohexane converted to 31 grams or 7%. The respective yields are 81% adipic, 0% nitrocyclohexane (650 g. in—645 g. out). The gaseous products were largely $N_2$, $N_2O$, NO, $NO_2$ and $CO_2$. The total $CO_2$ was equivalent to the glutaric and succinic acid produced.

EXAMPLE 27

(*2-nitropropane solvent*).—To the stirred reactor in FIGURE 1 were charged 540 g. of 57 wt. percent nitric acid containing 0.3% copper and 0.1% vanadium catalysts and 173 g. of a solution of 2-nitropropane (50 wt. percent) in cyclohexane (50 wt. percent). The mixture was heated to the desired reaction temperature of 110° C. and agitated for a period equal to the nominal residence time during subsequent continuous operation, while allowing the pressure to increase autogenously to the desired operating pressure of 200 p.s.i.g. Then over a 105-minute period were delivered 2820 g. of the nitric acid and 910 g. of the 2-nitropropane solution, while maintaining the liquid level in the reactor constant by bleeding off the mixture of the two liquid phases. The nominal residence time was thus 30 minutes. Pressure was held constant by bleeding off gas. Under these conditions, the nitric acid concentration in the aqueous phase was 40 wt. percent and the oil phase contained 6.6 wt. percent nitrocyclohexane, 55 wt. percent 2-nitropropane, 37% cyclohexane and 1.4% DNCH on an organics basis.

The liquid stream exit the reactor plus that remaining in the reactor on termination of the experiment contained 196 g. of adipic acid, 16 g. of glutaric acid, 7.5 g. of succinic acid and 65 g. of nitrocyclohexane distributed between the two liquid phases according to their solubilities. Small amounts of 1,1- and 1,2-dinitrocyclohexane were also present, bringing the total cyclohexane converted to 173 g. or 32%, of which 64% appeared as adipic acid and 24% appeared as nitrocyclohexane. The ratio of nitration products to oxidation products was 0.38, which is substantially lower than obtained from cyclohexane in the absence of a nitro-solvent (see Examples 13 and 14).

EXAMPLE 28

To the stirred reactor in FIGURE 1, while operating at the steady state conditions of the experiment, were delivered over a 90-minute period 612 g. of 61% (wt.) nitric acid and 164 g. of a solution of nitrocyclohexane (40 wt. percent) in cyclohexane (60 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 56 minutes. The pressure was maintanied at 350 p.s.i.g. by bleeding off gas. The temperature was constant at 110° C. Under these conditions the nitric acid concentration in the aqueous phase was 40 wt. percent, and the oil phase contained 62 wt. percent of nitrocyclohexane on an organics basis.

The liquid stream exit the reactor during this period contained 58.6 g. of adipic acid, 6.12 g. of glutaric acid, 3.53 g. of succinic acid and 59 g. of nitrocyclohexane distributed between the two liquid phases according to their solubilities. Small amounts of 1,1- and 1,2-dinitrocyclohexane were also present, bringing the total equivalent of cyclohexane converted to 41.3 g., or 42%, of which 82% appeared as adipic acid. This experiment resulted in a net conversion of 7.0 g. of nitrocyclohexane to dibasic acids.

EXAMPLE 29

To the stirred reactor in FIGURE 1, while operating at the steady state conditions of the experiment, were delivered over a 45-minute period 1012 g. of 68% (wt.) nitric acid and 322 g. of a solution of nitrocyclohexane (50 wt. percent) in cyclohexane (50 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 16 minutes. The pressure was maintained at 200 p.s.i.g. by bleeding off gas. The temperature was constant at 110° C. Under these conditions the nitric acid concentration in the aqueous phase was 55 wt. percent, and the oil phase contained 62 wt. percent nitrocyclohexane on an organics basis.

The liquid stream exit the reactor during this period contained 72.3 g. of adipic acid, 6.91 g. of glutaric acid, 2.94 g. of succinic acid and 161.3 g. of nitrocyclohexane distributed between the two liquid phases according to their solubilities. Small amounts of 1,1- and 1,2-dinitrocyclohexane were also present, bringing the total cyclohexane converted to 49.7 g., or 31%, of which 84% appeared as adipic acid and 0% appeared as nitrocyclohexane. The consumption of nitric acid as represented by $N_2O$, $N_2$ and dinitrocyclohexane was 0.7 g. per gram of adipic acid.

EXAMPLE 30

To the stirred reactor in FIGURE 1, while operating at the steady state conditions of the experiment, were delivered over a 120-minute period 818 g. of 61% (wt.) nitric acid and 218 g. of a solution of nitrocyclohexane (40 wt. percent) in cyclohexane (60 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 54 minutes. The pressure was maintained at 200 p.s.i.g. by bleeding off gas. The temperature was constant at 110° C. Under these conditions the nitric acid concentration in the aqueous phase was 40 wt. percent, and the oil phase contained 58 wt. percent nitrocyclohexane on an organics basis.

The liquid stream exit the reactor during this period contained 51.7 g. of adipic acid, 5.17 g. of glutaric acid, 2.95 g. of succinic acid and 84.3 g. of nitrocyclohexane distributed between the two liquid phases according to their solubilities. Small amounts of 1,1- and 1,2-dinitrocyclohexane were also present, bringing the total cyclohexane converted to 35.4 g., or 27%, of which 80% appeared as adipic acid and 0% appeared as nitrocyclohexane.

EXAMPLE 31

To the stirred reactor in FIGURE 1, while operating at the steady state conditions of the experiment, were delivered over a 90-minute period 976 g. of 59% (wt.) nitric acid and 154 g. of a solution of nitrocyclohexane (40 wt. percent) in cyclohexane (60 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 39 minutes. The pressure was maintained at 350 p.s.i.g. by bleeding off gas. The temperature was constant at 110° C. Under these conditions the nitric acid concentration in the aqueous phase was 46 wt. percent, and the oil phase contained 57 wt. percent nitrocyclohexane on an organics basis.

The liquid stream exit the reactor during this period contained 56.3 g. of adipic acid, 6.37 g. of glutaric acid, 3.43 g. of succinic acid and 62.7 g. of nitrocyclohexane distributed between the two liquid phases according to their solubilities. Small amounts of 1,1- and 1,2-dinitrocyclohexane were also present, bringing the total cyclohexane converted to 41.4 g., or 45%, of which 79% appeared as adipic acid and 2% appeared as nitrocyclohexane.

EXAMPLE 32

To the stirred reactor in FIGURE 1, while operating at the steady state conditions of the experiment, were delivered over a 180-minute period 1330 g. of 70% (wt.) nitric acid and 132 g. of a solution of nitrocyclohexane (50 wt. percent) in cyclohexane (50 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 58 minutes. The pressure was maintained at 200 p.s.i.g. by bleeding off gas. The temperature was constant at 110° C. Under these conditions the nitric acid concentration in the aqueous phase was 58 wt. percent, and the oil phase contained 67 wt. percent nitrocyclohexane on an organics basis.

The liquid stream exit the reactor during this period contained 59.5 g. of adipic acid, 8.60 g. of glutaric acid, 5.23 g. of succinic acid and 54.9 g. of nitrocyclohexane distributed between the two liquid phases according to their solubilities. Small amounts of 1,1- and 1,2-dinitrocyclohexane were also present, bringing the total equivalent of cyclohexane converted to 43.7 g., or 67%, of which 78% appeared as adipic acid. There was a net conversion of 11 g. of nitrocyclohexane to dibasic acids.

EXAMPLE 33

To the stirred reactor in FIGURE 1, while operating at the steady state conditions of the experiment, were delivered over a 90-minute period 889 g. of 70 percent (wt.) nitric acid and 406 g. of a solution of nitrocyclohexane (50 wt. percent) in cyclohexane (50 wt. percent). The nitric acid contained 0.3% copper and 0.1% vanadium as dissolved nitrate and vanadate. The liquid level in the reactor was held constant by bleeding off the mixture of the two liquid phases, resulting in a nominal residence time of 30 minutes. The pressure was maintained at 200 p.s.i.g. by bleeding off gas. The temperature was constant at 110° C. Under these conditions the nitric acid concentration in the aqueous phase was 45 wt. percent, and the oil phase contained 64 wt. percent nitrocyclohexane on an organic basis.

The liquid stream exit the reactor during this period contained 112.7 g. of adipic acid, 10.72 g. of glutaric acid, 5.36 g. of succinic acid and 209.6 g. of nitrocyclohexane distributed between the two liquid phases according to their solubilities. Small amounts of 1,1- and 1,2-dinitrocyclohexane were also present, bringing the total cyclohexane converted to 82.4 g., or 41%, of which 79% appeared as adipic acid and 5% appeared as nitrocyclohexane.

EXAMPLE 34

After the reactor and separator were flushed with helium, 400 cc. of 68% $HNO_3$ containing as soluble salts 0.3% Cu and 0.1% V were pumped into the reactor. 200 cc. of an oil phase containing 50% cyclohexane and 50% nitrocyclohexane were added. The cyclohexane was labelled with $C^{14}$. The molar activity was $5.6 \times 10^6$ DPM/mole (DPM≡disintegrations, $\beta^-$, per minute). The molar activity of the nitrocyclohexane was nil. The reactor and contents were heated to 110° C. in 20 minutes and this temperature maintained until the pressure reached 200 p.s.i.g. (30 min.). At this time the nitric acid feed and the oil feed were pumped into the reactor at the rate of 14 cc./min. and 6 cc./min., respectively. Throughout the experiment the temperature was controlled at 110° C. and the pressure maintained at 200 p.s.i.g. by removing continuously both liquid and gas phases. After a total of 1160 cc. of nitric acid and 550 cc. of oil phase were pumped into or through the reactor, steady state conditions were reached. At this time the products (liquid and gaseous) were collected and measured separately from startup portion of the run. The average reaction time in the reactor was 28 minutes and the composition of the nitric phase during steady state was 53% $HNO_3$, 8.4% DBA, 38% $H_2O$. The oil phase contained on an organics basis 62% NCH, 36% CH, 1.8% DNCH. During the steady state portion of the run, a total of 1415 cc. of nitric feed and 580 cc. of oil feed were delivered to the reactor. The products obtained which were associated with this feed were 143 grams of adipic acid, 16 grams of glutaric acid, 6.5 grams of succinic acid, 0 grams of nitrocyclohexane (net), 7 grams of dinitrocyclohexane, bringing the total cyclohexane converted to 100 grams or 38%. The respective yields are 82% adipic, 0% nitrocyclohexane (net). The gaseous products were largely $N_2$, $N_2O$, NO, $NO_2$ and $CO_2$. The $N_2$ and $N_2O$ produced were equivalent to 0.65 g. $HNO_3$ per g. adipic acid. The total $CO_2$ was equivalent to the glutaric and succinic acid produced.

The cyclohexane and nitrocyclohexane were separated by distillation. The molar activity of the cyclohexane was essentially the same as initially, i.e. $5.6 \times 10^6$ DPM/mole. The total radioactivity in the nitrocyclohexane was $1.72 \times 10^6$ DPM which corresponds to 0.31 mole of cyane which was converted to nitrocyclohexane. Since 257 g. of NCH were put through the reactor and 257 g. were recovered, then 0.31 mole of NCH was made from cyane and 0.31 NCH was converted to dibasic acids (mostly adipic) and dinitrocyclohexane.

*Purpose of Examples 35, 36.*—To show the 1,1- dinitrocyclohexane (a by-product of the nitric acid oxidation of cyclohexane) is as effective as nitrocyclohexane and 2-nitropropane in reducing the ratio of "initially" formed nitrocyclohexane/adipic acid below the 0.8–1.0 value obtained from cyclohexane alone.

EXAMPLE 35

To the stirred reactor in FIGURE 1, while operating at the steady state conditions of the experiment, were delivered over a 60-minute period 890 g. of 69% (wt.) nitric acid and 340 g. of a solution of 1,1-dinitrocyclohexane (79 wt. percent) and cyclohexane (20 wt. percent) containing 0.1% NCH and 0.6% 1,2-dinitrocyclohexane. The nitric acid contained 0.3% copper and 0.1% vanadium as dissolved nitrate and vanadate. The liquid level in the reactor was held constant by bleeding off the mixture of the two liquid phases, resulting in a nominal residence time of 28 minutes. The pressure was maintained at 200 p.s.i.g. by bleeding off gas. The temperature was constant at 110° C. Under these conditions the nitric acid concentration in the aqueous phase was 59 wt. percent, and the oil phase contained 3.3 wt. percent nitrocyclohexane and 86 wt. percent 1,1-dinitrocyclohexane on an organics basis.

The liquid stream exit the reactor during this period contained 48.86 g. of adipic acid, 5.77 g. of glutaric acid, 3.43 g. of succinic acid and 9.86 g. of nitrocyclohexane distributed between the two liquid phases according to their solubilities. The total cyclohexane converted amounted to 39.7 g., or 59%, of which 71% appeared as adipic acid and 15% appeared as nitrocyclohexane. This is equivalent to a nitrocyclohexane/DBA ratio of 0.18 which is even less than the 0.30 ratio obtained in the radiotracer experiment (Example 34). Since the concentration of NCH in the reactor was quite low, little oxidation of NCH occurred relative to the cyclohexane oxidized. Thus, the final NCH value is representative of the initial extent of nitration relative to oxidation, showing that 1,1-dinitrocyclohexane is quite effective in suppressing nitration (see Example 27 using 2-nitropropane in a similar experiment).

EXAMPLE 36

To the stirred reactor in FIGURE 1 were charged 408 g. of 59 wt. percent of nitric acid and containing 0.3% copper and 0.1% vanadium catalysts and 66.5 g. of cyclohexane. The mixture was heated to the desired reaction temperature of 110° C. and agitated for a period of 34 minutes, while allowing the pressure to increase autogenously to a pressure of 80 p.s.i.g. Under these conditions the oil phase contained 1.8 wt. percent nitrocyclohexane on an organics basis.

The liquid in the reactor on termination of the experiment contained 5.41 g. of adipic acid, 0.50 g. of glutaric acid, 0.26 g. of succinic acid and 3.89 g. of nitrocyclohexane distributed between the two liquid phases according to their solubilities. Thus the total cyclohexane converted was 6.08 g., or 9.3%, of which 50.5% appeared as adipic acid and 41% appeared as nitrocyclohexane. This is equivalent to a nitrocyclohexane/adipic acid ratio of 0.81.

*Purpose of Example 38.*—To show that adipic acid may be produced directly from cyclohexane while making no net nitrocyclohexane in a tubular reactor process.

EXAMPLE 38

To one inlet of the mixing T of a reactor of the type described in FIGURE 2 was pumped a preheated mixture (133° C.) composed of 72.3 cc./min. of 60% $HNO_3$ containing 0.3% wt. copper and 0.1% wt of ammonium metavanadate and 37.0 cc./min. of liquid nitrogen dioxide-dinitrogen tetroxide. To the other inlet was delivered a similarly preheated solution of 25.4 cc./min. of cyclohexane containing 11.0% wt. of nitrocyclohexane. A total pressure of 600 p.s.i.g. was maintained on the reactor by bleeding off the liquid and gaseous products at the end of the pipeline. The mixed stream passed through the 120 ft. long x 1/8" I.D. strainless steel tubular reactor in 117 sec. The reactor was immersed in a bath of heat exchange fluid maintained at 112° C., and a maximum temperature of 116° C. was reached by the reaction mixture midway in the reactor. The products emerging from the reactor were let down to atmospheric pressure and quenched by injection of iced water.

The recovered water-insoluble organic material amounted to 17.8 cc./min. of cyclohexane containing 15.6% wt. of nitrocyclohexane. The feed thus contained 2.23 g./min. NCH and the product oil contained 2.24 g./min., hence essentially zero net yield of NCH was thus obtained. Cyclohexane delivered was 17.99 g./min., and that recovered amounted to 15.52 g., corresponding to a 13.2% conversion of cyclohexane in one pass through the reactor. The aqueous layer of the product contained 3.019 g./min. of adipic acid or its equivalent. There were small amounts of materials present which were easily converted to adipic acid in quantitative yield by simply refluxing the nitric acid solution of the dibasic acids at atmospheric pressure. The aqueous phase also contained 0.854 g./min. of glutaric acid and 0.032 g./min. of succinic acid. Yield of adipic acid in the reaction was thus 74 mole percent.

TABLE 1.—CONTINUOUS NITRIC ACID ($NO_2$) OXIDATION OF CYCLOHEXANE

| Example Number | Aqueous Layer Charged to Reactor | | | | | Organic Layer Charged to Reactor | | | | | Reactor Operating Conditions | | | | | | |
|---|---|---|---|---|---|---|---|---|---|---|---|---|---|---|---|---|---|
| | Primary, grams | Secondary, grams | $HNO_3$, Wt. percent | Copper Catalyst, Wt. percent | Vanadium Catalyst, Wt. percent | Primary, grams | Secondary, grams | Cyclohexane, Wt. percent | Nitrocyclohexane, Wt. percent | Dinitrocyclohexane, Wt. percent | Aqueous/Organic Ratio, vol./vol. | Temperature, °C. | Pressure, p.s.i.g. | Secondary Charging Period, min. | Nominal Residence Time, min. | Wt. percent $HNO_3$ in Aqueous Phase at Equilibrium | Wt. percent NCH in Organic Phase at Equilibrium |
| 1 | 140 | 224 | 70 | 0.3 | 0.1 | 247 | 441 | 79.5 | 20.5 | 0 | 0.31 | 110 | 125 | 60 | 33 | 30 | 32 |
| 2 | | 641 | 69 | 0.3 | 0.1 | | 483 | 78 | 22 | 0 | 0.78 | 110 | 150 | 60 | 20 | 35 | 39 |
| 3 | 211 | 1,130 | 70 | 0 | 0 | 164 | 875 | 80 | 20 | 0 | 0.75 | 110 | 100 | 150 | 27 | 40 | 35 |
| 4 | | 1,480 | 67 | 0.3 | 0.1 | | 453 | 75 | 25 | 0 | 1.92 | 110 | 100 | 120 | 27 | 52 | 39.6 |
| 5 | 364 | 1,060 | 67 | 0.3 | 0.1 | 108 | 300 | 74.8 | 25.2 | 0 | 2.07 | 110 | 50 | 105 | 27 | 59 | 28 |
| 6 | | 205 | 19 | 0.3 | 0.1 | | 427 | 100 | 0 | 0 | 0.34 | 125 | 100 | 120 | 65 | 6.5 | 6.9 |

The above examples show the effect of $HNO_3$ concentration in the aqueous phase and $HNO_3$/cyclohexane ratio on yield of adipic acid and NCH.

| 3 | 211 | 1,130 | 70 | 0 | 0 | 164 | 875 | 80 | 20 | 0 | 0.75 | 110 | 100 | 150 | 27 | 40 | 35 |
| 7 | 211 | 1,340 | 68 | 0.3 | 0.1 | 165 | 943 | 78.5 | 21.5 | 0 | 0.82 | 110 | 100 | 150 | 25 | 37 | 37 |
| 8 | 225 | 1,635 | 68 | 0 | 0.1 | 192 | 1,135 | 79 | 21 | 0 | 0.81 | 110 | 100 | 180 | 25 | 41 | 36 |
| 37 | 212 | 1,325 | 68 | 0.3 | 0 | 182 | 1,188 | 78.4 | 21.6 | 0 | 0.65 | 110 | 100 | 165 | 26 | 40 | 32 |
| 20 | 612 | 2,670 | 54 | 0.5 | 0.5 | 131 | 663 | 59 | 41 | 0 | 2.86 | 110 | 200 | 135 | 30 | 45 | 48 |
| 23 | 140 | 1,865 | 70 | 0.3 | 0.06 | 290 | 1,930 | 25 | 75 | 0 | 0.62 | 110 | 48 | 300 | 32 | 56 | 80 |
| 24 | 540 | 2,260 | 58 | 0.3 | 0.4 | 183 | 803 | 43 | 57 | 0 | 2.0 | 110 | 200 | 120 | 24 | 47 | 66 |

The above examples show the catalytic effect of copper and vanadium in increasing adipic acid content of dibasic acids.

| 4 | | 1,480 | 67 | 0.3 | 0.1 | | 453 | 75 | 25 | 0 | 1.92 | 110 | 100 | 120 | 27 | 52 | 39.6 |
| 9 | | 720 | 69 | 0.3 | 0.1 | | 197 | 75 | 25 | 0 | 2.14 | 110 | 100 | 120 | 60 | 54 | 41 |
| 10 | | 1,330 | 69 | 0.3 | 0.1 | | 375 | 100 | 0 | 0 | 1.96 | 110 | 100 | 120 | 30.5 | 55 | 17 |

The above examples show the effect of adding oxygen to the reactor on reducing the level of $NO+NO_2$ generated in the reaction.

| 10 | | 1,330 | 69 | 0.3 | 0.1 | | 375 | 100 | 0 | 0 | 1.96 | 110 | 100 | 120 | 30.5 | 55 | 17 |
| 12 | | 1,225 | 61 | 0.3 | 0.1 | | 147 | 100 | 0 | 0 | 4.73 | 110 | 350 | 90 | 30 | 49 | 25 |
| 13 | 433 | 1,692 | 58 | 0.3 | 0.1 | 33.2 | 135 | 100 | 0 | 0 | 5.78 | 110 | 50 | 120 | 31 | 56 | 4.6 |
| 14 | 141 | 739 | 68 | 0 | 0.1 | 324 | 3,576 | 100 | 0 | 0 | 0.11 | 110 | 100 | 128 | 10 | 43 | 3.0 |
| 24 | 540 | 2,260 | 58 | 0.3 | 0.4 | 183 | 803 | 43 | 57 | 0 | 2.0 | 110 | 200 | 120 | 24 | 47 | 66 |

The above examples illustrate that the yield of adipic acid is proportional to the concentration of nitrocyclohexane at equilibrium.

| 18 | | 339 | 68 | 0.3 | 0.1 | | 110 | 50 | 50 | 0 | 1.94 | 100 | 350 | 30 | 29 | 56 | 61 |
| 28 | | 612 | 61 | 0.3 | 0.1 | | 164 | 60 | 40 | 0 | 2.35 | 110 | 350 | 90 | 56 | 40 | 62 |
| 26 | 540 | 3,160 | 58 | 0.3 | 0.3 | 185 | 917 | 41 | 59 | 0 | 2.3 | 120 | 50 | 70 | 9 | 53 | 63 |
| 25 | | 1,520 | 58 | 0.3 | 0.3 | | 443 | 41 | 59 | 0 | 2.3 | 120 | 50 | 29 | 9 | 53 | 63 |

The above examples demonstrate high adipic yields at 100° C., 110° C., and 120° C.

| 23 | 140 | 1,865 | 70 | 0.4 | 0.06 | 290 | 1,930 | 25 | 75 | 0 | 0.62 | 110 | 48 | 300 | 32 | 56 | 80 |
| 33 | | 889 | 70 | 0.3 | 0.1 | | 406 | 50 | 50 | 0 | 1.38 | 110 | 200 | 90 | 30 | 45 | 64 |
| 21 | 414 | 824 | 68 | 0.3 | 0.1 | 55 | 112 | 75 | 25 | 0 | 4.3 | 110 | 350 | 60 | 27 | 53 | 48 |
| 19 | 500 | 898 | 68 | 0.3 | 0.1 | 30 | 53.8 | 75 | 25 | 0 | 9.8 | 110 | 350 | 58 | 28 | 58 | 41 |
| 15 | 210 | 678 | 70 | | 0.06 | 280 | 1,050 | 33 | 67 | 0 | 0.44 | 110 | 70 | 240 | 30 | 40 | 74 |
| 16 | | 1,010 | 68 | 0.3 | 0.1 | | 314 | 50 | 50 | 0 | 2.03 | 110 | 200 | 90 | 31 | 49 | 65.5 |

The above examples illustrate that high adipic yields are obtained at various ratios of phases and pressures providing NCH at equilibrium is high.

TABLE 1—Continued

| Example Number | Aqueous Layer Charged to Reactor | | | | | Organic Layer Charged to Reactor | | | | | Reactor Operating Conditions | | | | | | |
|---|---|---|---|---|---|---|---|---|---|---|---|---|---|---|---|---|---|
| | Primary, grams | Secondary, grams | $HNO_3$, Wt. percent | Copper Catalyst, Wt. percent | Vanadium Catalyst, Wt. percent | Primary, grams | Secondary, grams | Cyclohexane, Wt. percent | Nitrocyclohexane, Wt. percent | Dinitrocyclohexane, Wt. percent | Aqueous/Organic Ratio, vol./vol. | Temperature, °C. | Pressure, p.s.i.g. | Secondary Charging Period, min. | Nominal Residence Time, min. | Wt. percent $HNO_3$ in Aqueous Phase at Equilibrium | Wt. percent NCH in Organic Phase at Equilibrium |
| 30 | | 818 | 61 | 0.3 | 0.1 | | 218 | 60 | 40 | 0 | 2.37 | 110 | 200 | 120 | 54 | 40 | 58 |
| 29 | | 1,012 | 68 | 0.3 | 0.1 | | 322 | 50 | 50 | 0 | 1.99 | 110 | 200 | 45 | 16 | 55 | 62 |

The above examples illustrate acid concentrations of 40 or 55% can be used to produce adipic acid in high yields.

| 17 | | 1,356 | 68 | 0.3 | 0.1 | | 428 | 50 | 50 | 0 | 2.0 | 100 | 350 | 120 | 33 | 54 | 60 |
| 20 | | 2,670 | 54 | 0.5 | 0.5 | 131 | 663 | 59 | 41 | 0 | 2.86 | 110 | 200 | 135 | 30 | 45 | 48 |
| 22 | 612 | 1,440 | 68 | 0.3 | 0.1 | | 482 | 48 | 52 | 0 | 1.91 | 110 | 200 | 90 | 30 | 47 | 59 |
| 31 | | 976 | 59 | 0.3 | 0.1 | | 154 | 60 | 40 | 0 | 4.01 | 110 | 350 | 90 | 39 | 46 | 57 |
| 32 | | 1,330 | 70 | 0.3 | 0.1 | | 132 | 50 | 50 | 0 | 6.35 | 110 | 200 | 180 | 58 | 58 | 67 |
| 34 | | 2,000 | 68 | 0.3 | 0.1 | | 516 | 50 | 50 | 0 | 2.44 | 110 | 200 | 100 | 28 | 53 | 62 |

The above examples demonstrate further variation in conditions which will produce high yields of adipic acid.

| 27 | 540 | 2,820 | 57 | 0.3 | 0.1 | 173 | 910 | 50 | 0 | [1] 50 | 2.0 | 110 | 200 | 105 | 30 | 40 | [2] 6.6 |

Example 27 illustrates the use of a secondary nitro compound to reduce yield to nitration products at equilibrium.

| 35 | | 890 | 69 | 0.3 | 0.1 | | 340 | 20 | 0 | 80 | [1] (4.8) | 110 | 200 | 60 | 28 | 59 | [1] 3.3 |
| 36 | 408 | | 59 | 0.3 | 0.1 | 66.5 | | 100 | 0 | 0 | | 110 | 80 | | 34 | >50 | Avg. 1.8 |

The above examples represent batch experiments (No. 36 a blank) demonstrating the effect of 1,1-DNCH on increasing adipic acid yield by suppressing the formation of NCH at low concentrations of NCH.

| 38 | | | | | | | | 89 | 11 | | | 116 | 600 | | | | 15.6 |

Example No. 38 covers an oxidation in a tubular reactor, which also gives a 0% yield of NCH.

| Example Number | Products Exit Reactor | | | | | | Summary of Results | | | | Remarks |
|---|---|---|---|---|---|---|---|---|---|---|---|
| | Adipic Acid, grams | Succinic Acid, grams | Glutaric Acid, grams | Total Nitrocyclohexane, grams | Dinitrocyclohexanes, grams | $NO_2+NO$, as $HNO_3$ Equivalent, grams/g. AdOH | $N_2O+N_2+DNCH$, as $HNO_3$ Equivalent, grams/g. AdOH | Conversion of Cyclohexane, percent | Yield to Adipic Acid, percent | Yield to Nitrocyclohexane, percent | |
| 1 | 33 | 3.5 | 6.4 | 192 | | | | 10.7 | 32 | 55 | Percent Conversion of CH to Products. |
| 2 | 87 | 3.1 | 8.2 | 183 | 13.5 | | 0.7 | 30 | 44 | 44 | Adipic Acid=69% of dibasic acids. |
| 3 | 149 | 27.8 | 29.3 | 318 | 25 | | 1.1 | 25.7 | 41 | 34 | |
| 4 | 103 | 5.7 | 11.0 | 140 | 6.9 | | 0.7 | 27 | 65 | 19 | |
| 5 | 43.5 | 2.72 | 4.16 | 106.4 | 1.1 | | 0.6 | 10.7 | 77 | 7 | |
| 6 | 5.86 | 0.97 | 2.31 | 28.6 | | | 2.4 | 5.8 | 14 | 75 | See Example No. 6, text. |

The above examples show the effect of $HNO_3$ concentration in the aqueous phase and $HNO_3$/cyclohexane ratio on yield of adipic acid and NCH.

| 3 | 149 | 27.8 | 29.3 | 318 | 25 | | 1.1 | 25.7 | 41 | 34 | Adipic Acid=69% of dibasic acids. |
| 7 | 266 | 13.6 | 27.6 | 325 | 34.2 | | 0.9 | 29.6 | 61 | 23 | Adipic Acid=85% of dibasic acids. |
| 8 | 285 | 13.3 | 26.9 | 370 | 30.5 | | | 25 | 62 | 22 | Adipic Acid=86% of dibasic acids. |
| 37 | 175 | 25.4 | 31.1 | 398 | 18.6 | | 0.95 | 19.6 | 46 | 32 | Adipic Acid=73% of dibasic acids. |
| 20 | 103 | 3.7 | 8.3 | 306 | | | | 15.5 | 81 | 0 | Adipic Acid=88% of dibasic acids. |
| 23 | 175 | 15.5 | 24.4 | 1,580 | | | | 23 | 79 | 0 | Adipic Acid=79% of dibasic acids. |
| 24 | 170 | 7.1 | 14.5 | 562 | 18 | | | 28 | 82 | 0 | Adipic Acid=87.3% of dibasic acids. |

The above examples show the catalytic effect of copper and vanadium in increasing adipic acid content of dibasic acids.

TABLE 1—Continued

| Example Number | Products Exit Reactor | | | | | | | Summary of Results | | | Remarks |
|---|---|---|---|---|---|---|---|---|---|---|---|
| | Adipic Acid, grams | Succinic Acid, grams | Glutaric Acid, grams | Total Nitrocyclohexane, grams | Dinitrocyclohexanes, grams | NO$_2$+NO, as HNO$_3$ Equivalent, grams/g. AdOH | N$_2$O+N$_2$+DNCH, as HNO$_3$ Equivalent, grams/g. AdOH | Conversion of Cyclohexane, percent | Yield to Adipic Acid, percent | Yield to Nitrocyclohexane, percent | |
| 4 | 103 | 5.7 | 11.0 | 1.40 | 6.9 | 1.19 | 0.7 | 27 | 65 | 19 | No O$_2$ added. |
| 9 | 62.3 | 4.16 | 6.83 | 60.3 | 3.36 | 0.11 | 0.74 | 36 | 68 | 15 | Injected 0.49 mole O$_2$ during experiment. |
| 10 | 87.2 | 4.16 | 8.88 | 56.4 | 7.3 | 0.91 | 0.76 | 26.5 | 50.5 | 37 | No O$_2$ added. |

The above examples show the effect of adding oxygen to the reactor on reducing the level of NO+NO$_2$ generated in the reaction.

| 10 | 87.2 | 4.16 | 8.88 | 56.4 | 7.3 | 0.91 | 0.76 | 26.5 | 50.5 | 37 | |
| 12 | 63.8 | 3.09 | 6.19 | 33.9 | 2 | | | 46 | 55 | 33 | |
| 13 | 12.8 | 0.83 | 1.21 | 13.6 | | | | 10.7 | 41 | 50 | |
| 14 | 125 | 5.6 | 12.6 | 108 | 3.5 | | | 4.0 | 46 | 45 | |
| 24 | 170 | 7.1 | 14.5 | 562 | 18 | | | 28 | 82 | 0 | |

The above examples illustrate that the yield of adipic acid is proportional to the concentration of nitrocyclohexane at equilibrium.

| 18 | 23.9 | 0.84 | 2.05 | 53 | 0.69 | | 0.82 | 29 | 86 | 0 | |
| 28 | 58.6 | 3.53 | 6.12 | 59 | 2.04 | | | 42 | 82 | 0 | |
| 26 | 45.1 | 3.20 | 4.0 | 645 | 2.0 | | 0.8 | 7 | 81 | 0 | |
| 25 | 14.8 | 1.2 | 1.4 | 262 | 0.08 | | | 6 | 79 | 0 | |

The above examples demonstrate high adipic yields at 100° C., 110° C., and 120° C.

| 23 | 175 | 15.5 | 24.4 | 1,580 | | | | 23 | 79 | 0 | |
| 33 | 112.7 | 5.4 | 10.7 | 210 | 5.2 | | | 41 | 79 | 5 | |
| 21 | 83.4 | 4.1 | 9.3 | 42.0 | 2.5 | | | 48 | 80 | 3 | |
| 19 | 49 | 2.9 | 6.5 | 21.0 | 0.3 | | | 56 | 79.8 | 2.3 | |
| 15 | 131 | 11.0 | 15.2 | 892 | | | | 21 | 81 | 0 | |
| 16 | 94.4 | 4.6 | 9.4 | 152 | 3.5 | | | 42 | 83 | 0 | |

The above examples illustrate that high adipic yields are obtained at various ratios of phases and pressures providing NCH at equilibrium is high.

| 30 | 51.7 | 2.95 | 5.17 | 84.3 | | | | 28 | 80 | 0 | |
| 29 | 72.3 | 2.94 | 6.91 | 161.3 | 3.1 | | 0.7 | 31 | 84 | 0 | |

The above examples illustrate acid concentrations of 40 or 55% can be used to produce adipic acid in high yields.

| 17 | 95.5 | 3.4 | 8.2 | 218 | | | 0.72 | 31 | 83 | 3 | |
| 20 | 103 | 3.7 | 8.3 | 306 | | | | 15.5 | 81 | 0 | |
| 22 | 117 | 5.6 | 14 | 251 | 4.2 | | | 35.5 | 81 | 0 | |
| 31 | 56.3 | 3.43 | 6.37 | 62.7 | | | | 45 | 79 | 2 | |
| 32 | 59.5 | 5.23 | 8.6 | 54.9 | | | | 66.5 | 78 | 0 | |
| 34 | 143 | 6.50 | 16.0 | 257 | 7 | | 0.65 | 38 | 82 | 0 | Net loss of NCH to DBA. |

The above examples demonstrate further variation in conditions which will produce high yields of adipic acid.

| 27 | 196 | 7.5 | 16 | 65 | 12.5 | | | 32 | 64 | 24 | [1] 2-nitropropane. [2] 57% 2-nitropropane. |

Example 27 illustrates the use of a secondary nitro compound to reduce yield to nitration products at equilibrium.

| 35 | 48.86 | 3.43 | 5.77 | 9.86 | | | | 59 | 71 | 15 | [1] 86% 1,1-DNCH. |
| 36 | 5.41 | 0.26 | 0.50 | 3.89 | 0 | | | 9.3 | 50 | 41 | [1] Mole HNO$_3$/Mole Cyane. |

The above examples represent batch experiments (No. 36 a blank) demonstrating the effect of 1,1-DNCH on increasing adipic acid yield by suppressing the formation of NCH at low concentrations of NCH.

| 38 | | | | | | | | 13 | 74 | 0 | See text for data. |

Example No. 38 covers an oxidation in a tubular reactor, which also gives a 0% yield of NCH.

EXAMPLE 39

This example, like Example 27, illustrates the effectiveness of an aliphatic nitroparaffin as solvent for cyclohexane in the process of this invention. The procedure was the same as that of Example 27 but the temperature was only 80° C. and higher concentrations of both nitric acid and 2-nitropropane were employed with the result that the yield of adipic acid was increased to 87% and the yield of nitrocyclohexane reduced to 2.4%. Reaction conditions and results are summarized in Table 2, following Example 42.

EXAMPLES 40, 41, AND 42

The internally-decanting reactor of FIGURE III was employed for these examples in which substantially 100% conversion of cyclohexane was obtained. There was a small mechanical loss of cyclohexane due to insufficient cooling of condenser 58 of FIGURE III which permitted a slight entrainment of cyclohexane vapor in the off gas. This can be avoided by increased efficiency of cooling. The procedure followed in these examples was similar to that of the examples described for the apparatus of FIGURE 1: The internally-decanting reactor was charged with sufficient nitric acid feed mix (including vanadium catalyst) to fill the decanting section (41 of FIGURE III); then further nitric acid feed mix and a solution of cyclohexane in nitrocyclohexane were charged to the autoclave to give the desired initial reactor contents (primary charge). This mixture was heated at reaction temperature until the desired pressure was reached, then pressure was maintained by bleeding off gas through the condenser. Operation was carried on at constant pressure and constant feed rates for a period equivalent to three or four times the nominal residence time. A composite sample of the aqueous reactor effluent containing dissolved DBA was taken over a period of time referred to in Table 2 as "secondary charging period." Operating conditions and results are summarized in Table 2. Calculations are based on the secondary charging period.

the nitroparaffins in increasing the yield of oxidation products relative to nitration products. A reaction mixture consisting of 63.4 parts by weight of 60% nitric acid (containing 0.3% copper and 0.1% vanadium catalysts), 31.0 parts of cyclohexane, and 5.6 parts of $NO_2$ ($N_2O_4$) initially was heated at 100° C. for four hours at autogenous pressure. The products were analyzed in the previously-described manner, and it was found that 14.4% of the cyclohexane was converted after this time. Of the cyclohexane converted, 45% appeared as nitrocyclohexane and 55% appeared as a mixture of adipic, glutaric and succinic acids (of which 81% by weight was adipic acid). This corresponds to a ratio of nitration to oxidation products of 0.83.

A similar experiment was carried out in which a mixture of 62.1 parts by weight of the same nitric acid solution, 6.7 parts of cyclohexane, 6.1 parts of $NO_2$ ($N_2O_4$), and 25.1 parts of nitrobenzene were treated as above. Here 63% of the cyclohexane was converted. Of the cyclohexane converted, 20% appeared as nitrocyclohexane and 80% appeared as a mixture of adipic, glutaric, and succinic acids (74% of which was adipic acid). This corresponds to a ratio of nitration to oxidation products of 0.25.

EXAMPLE 44

In this and the following example it is demonstrated that nitro-substituted carboxylic acids, both aliphatic and aromatic, influence the distribution of products between nitration and oxidation of the hydrocarbon. Thus, in a manner identical to that described in Example 43, 60% nitric acid containing copper and vanadium, cyclohexane, and $NO_2$ ($N_2O_4$) were mixed and heated together in the

TABLE 2.—NITRIC ACID OXIDATION OF CYCLOHEXANE

| Example Number | 39 | 40 | 41 | 42 | 46 |
|---|---|---|---|---|---|
| Aqueous Layer Charged: | | | | | |
| Primary, g | | 4,471 | 4,625 | 663 | 1,457 |
| Secondary, g | 590 | 60.7 | 61.0 | 60 | 59.8 |
| $HNO_3$, wt. percent | 70 | 0.3 | 0.3 | 0.3 | 0.3 |
| Copper catalyst, wt. percent | 0.3 | 0.1 | 0.1 | 0.1 | 0.1 |
| Vanadium catalyst, wt. percent | 0.1 | | | | |
| Organic Layer Charged: | | | | | |
| Primary, g | | 532 | 433 | 68.1 | 145 |
| Secondary, g | 221 | 58 | 58 | 63 | 70 |
| Cyclohexane, wt. percent | 25 | 42 | 42 | 37 | 2 (30) |
| Nitrocyclohexane, wt. percent | 1 (75) | | | | |
| Reactor Operating Conditions: | | | | | |
| Aq./oil ratio in reactor | 1.7 | 0.76 | 0.3 | 0.53 | 0.4 |
| Temperature, °C | 80 | 114 | 100 | 90 | 100 |
| Pressure, p.s.i.g | 340 | 200 | 200 | 200 | 200 |
| Secondary charging period, min | 22 | 90 | 120 | 60 | 120 |
| Nominal Res. Time, min | 13 | 10 | 14 | 47 | 41 |
| Wt. percent $HNO_3$ in aq. phase | 69 | 42.3 | 45.7 | 44.9 | 49.0 |
| Wt. percent NCH in oil phase | 0.2 | 60 | 50.5 | 48.9 | 9.2 |
| Products Exit Reactor: | | | | | |
| Adipic acid, g | 11.5 | 399.0 | 313.9 | 53.14 | 132.9 |
| Succinic acid, g | 0.33 | 18.45 | 8.84 | 1.55 | 5.64 |
| Glutaric acid, g | 0.90 | 44.08 | 27.71 | 4.10 | 12.61 |
| Total NCH, g | 0.30 | 223.6 | 210.2 | 22.90 | 7.42 |
| Dinitrocyclohexanes | Trace | 26.2 | 14.4 | 0.69 | |
| $N_2O+N_2+DNCH$ as $HNO_3$ equiv., g./g. AdOH | | 0.69 | 0.67 | 0.72 | 0.83 |
| Summary of Results: | | | | | |
| Percent Conversion of Cyclohexane | 15 | 100 | 100 | 100 | 100 |
| Yield to adipic acid, percent | 87 | 80.1 | 78.6 | 88 | 82.1 |
| Yield to nitrocyclohexane, percent | 2.4 | 0 | 8.0 | 0 | 5.0 |

1 2-nitropropane.  2 1,1-dinitrocyclohexane.

The process as carried out in Examples 40–42 is a particularly preferred method for operating the process of this invention since, by providing for 100% conversion of cyclohexane with high yield of adipic acid and either zero or small yields of nitrocyclohexane, depending upon the desire for the latter product, the need for separating, recovering, and recycling cyclohexane is avoided.

EXAMPLE 43

The purpose of this example is to show that nitroaromatics such as nitrobenzene exhibit the same effect as same relative proportions and under the same conditions as indicated there. In this case p-nitrobenzoic acid was substituted for nitrobenzene in the same proportion. Analysis of the products showed that the ratio of nitration to oxidation products was 0.26.

EXAMPLE 45

In a manner similar to that in Examples 43 and 44, but in which β-nitropropionic acid was used as the nitro medium, a ratio of nitration to oxidation products of 0.30 was obtained. This value should again be compared to the 0.83 ratio obtained when no nitro compound was charged initially.

EXAMPLE 46

This example illustrates the use of the internal decantation process illustrated by FIGURE III for the simultaneous production of adipic acid and nitrocyclohexane from cyclohexane while employing 1,1-dinitrocyclohexane as solvent with 100% conversion of cyclohexane. The data are summarized in Table 2. No nitrocyclohexane was recycled. In this experiment, 1,1-dinitrocyclohexane made up 88% by weight, on an organics basis, at steady state, of the oil phase, and nitrocyclohexane 9.2% by weight, at steady state. The aqueous phase was continuously separated inside the reactor, drawn off, and separated by volatilization of water and nitrocyclohexane followed by cooling the residual aqueous $HNO_3$ and collecting precipitated adipic acid.

Thus, by the process of this invention, cycloparaffins can be oxidized in high conversions and yields directly to dicarboxylic acids containing the same number of carbon atoms with a great saving over prior processes in $HNO_3$ lost to useless by-products. When desired, the process can be adjusted to produce, simultaneously with the dicarboxylic acid, the corresponding nitrocycloparaffin which then can be used to produce an omega-lactam by hydrogenation and rearrangement. This flexibility makes the process especially useful and valuable in that one plant can produce one or both products in readily-varied ratio according to the relative demand for the products.

I claim:

1. In a process for the production of dicarboxylic acids by oxidation of a cycloalkane in the liquid state at a temperature in the range of 75° to 130° C. with aqueous nitric acid having a concentration of 35% to 80% by weight, on an aqueous basis, and containing a vanadium salt as catalyst, the improvement of conducting the oxidation in the presence of at least 10% by weight, based on the organic phase, of an added solvent for the cycloalkane consisting of at least one organic nitro-compound selected from the group consisting of aliphatic, cycloaliphatic and aromatic mono- and dinitrohydrocarbons and aliphatic, cycloaliphatic, and aromatic nitrocarboxylic acids.

2. The process of claim 1 in which a soluble copper salt is present in the aqueous $HNO_3$ as cocatalyst.

3. The process of claim 1 in which the cycloalkane is cyclohexane.

4. The process of claim 1 in which the cycloalkane is cyclododecane.

5. The process of claim 1 in which the proportion of organic nitro-compound added as solvent is sufficient to maintain the concentration of said nitro-compound solvent in the resulting oil phase in the oxidizing mixture in the range of about 40% to 97% by weight, on an organics basis.

6. In a process for the production of a dicarboxylic acid by oxidation of a cycloalkane with aqueous nitric acid, containing from 0.06% to 0.5% by weight, as vanadium, of a dissolved compound of vanadium, at temperatures in the range of 75° C. to 130° C. under a pressure sufficient to maintain cycloalkane in the liquid phase, the improvement of increasing the yield of the dicarboxylic acid containing the same number of carbon atoms as the cycloalkane while decreasing the conversion of nitric acid to $N_2$, $N_2O$, and nitrocycloalkanes by adding to the aqueous $HNO_3$, along with the cycloalkane, at least 25%, by weight, on a total added organics basis, of a nitrohydrocarbon solvent, selected from at least one member of the group consisting of mono- and dinitroalkanes, mono- and dinitrocycloalkanes, and aromatic nitro-hydrocarbons, and mixing said cycloalkane and nitrohydrocarbon with sufficient aqueous nitric acid, having a concentration of $HNO_3$ in the range of 35% to 80% on an aqueous basis, to provide at least a molar excess of $HNO_3$, relative to the cycloalkane, and maintaining the resulting oil and aqueous phases in contact for from about 0.5 to 60 minutes at the reaction temperature, said oil phase in the reacting mixture comprising at least about 40% nitrohydrocarbon on an organics basis.

7. A process according to claim 6 in which the aqueous nitric acid contains from 0.1% to 1.0% by weight, as copper, of a dissolved copper compound.

8. A process according to claim 6 in which the nitrohydrocarbon is a nitrocycloalkane derived from the cycloalkane being oxidized.

9. A process according to claim 6 in which the cycloalkane is cyclohexane.

10. A process according to claim 6 in which the cycloalkane is cyclododecane.

11. A process according to claim 6 in which $O_2$ is added to the reacting mixture to convert NO to $NO_2$.

12. In a continuous process for the production of adipic acid by the oxidation of cyclohexane with aqueous nitric acid containing from 0.06% to 0.5% by weight, as vanadium, of a dissolved vanadium compound and from 0.1% to 1% by weight, as copper, of a dissolved copper compound, at a temperature in the range of 80° C. to 120° C. under a pressure in the range of 40 to 1000 p.s.i.g., the improvement of increasing the yield of adipic acid while decreasing the conversion of nitric acid to $N_2$, $N_2O$, and nitrocyclohexane by admixing with the aqueous nitric acid, in addition to cyclohexane, from 25% to 80% by weight of the total organics added of an organic nitro-compound selected from at least one member of the group consisting of nitrocyclohexane and 1,1-dinitrocyclohexane, said aqueous nitric acid having a concentration, at steady state in the reacting mixture, of 40% to 60% by weight $HNO_3$, on an aqueous basis, and being present in the reacting mixture in a proportion of from 1 to 60 moles of $HNO_3$ per mole of cyclohexane, and continuously withdrawing from the reacting mixture a portion of the mixture of the resulting oil and aqueous phases at a rate such that the average contact time at reaction temperatures is from 2 to 60 minutes, the average conversion of cyclohexane per pass is from 5% to 70%, and the concentration of organic nitrocompounds in the oil phase is from 50% to 80% by weight, on an organics basis, separating the oil phase from the aqueous phase, recycling the oil phase, and recovering $HNO_3$ and adipic acid from the aqueous phase by removal of water by vaporization and subsequently cooling the residual nitric acid solution and collecting precipitated adipic acid.

13. A process according to claim 12 in which $O_2$ is added to the reacting mixture of convert NO to $NO_2$.

14. In a continuous process for the production of adipic acid by the oxidation of cyclohexane by continuously admixing cyclohexane with aqueous nitric acid containing from 0.06% to 0.5% by weight, as vanadium, of a dissolved vanadium compound and from 0.1% to 1.0%, by weight, as copper, of a dissolved copper compound, at a temperature in the range of 90° C. to 110° C. under a pressure in the range of 50 to 600 p.s.i.g., the improvement of increasing the yield of adipic acid while obtaining zero net yield of nitrocyclohexane by admixing with the aqueous nitric acid, in addition to cyclohexane, sufficient of a nitrohydrocarbon solvent, comprising 10% to 99.8% by weight nitrocyclohexane and 0.2% to 90% by weight 1,1-dinitrocyclohexane, to form an oil phase solution comprising 50% to 97% by weight, on an organics basis, of organic nitrohydrocarbon solvent in cyclohexane at steady state in the reacting mixture, said aqueous nitric acid in the reacting mixture having a concentration, at steady state, of 40% to 60% by weight $HNO_3$, on an aqueous basis, and being present in the reacting mixture in a proportion sufficient to provide an aqueous phase to oil phase volume ratio in the range of 0.4 to 10.0, and continuously taking off from the reacting mixture a portion of the mixture of the resulting oil and aqueous phases at a rate such that the average contact time of the two phases at reaction temperature is from about 2 to 60 minutes and the average conversion of cyclohexane is from 25% to 70% per pass, separating the oil phase, comprising cyclohexane and nitrohydrocarbon solvent, from the aqueous phase, recycling the oil phase, and recovering $HNO_3$ and adipic acid from the aqueous phase by removal of water by vaporization and subsequently cooling the residual nitric acid solution, collecting the precipitated adipic acid, and recycling the aqueous $HNO_3$ mother liquor.

15. A process according to claim 14 in which $O_2$ is added to the reacting mixture to convert NO to $NO_2$.

References Cited by the Examiner

UNITED STATES PATENTS

| | | | |
|---|---|---|---|
| 2,285,601 | 6/1942 | McAllister | 260—533 |
| 2,557,282 | 6/1951 | Hamblet et al. | 260—533 |
| 3,200,144 | 8/1965 | Baumgartner et al. | 260—533 |

OTHER REFERENCES

Weissberger, "Technique of Organic Chemistry," vol. VIII, Part I (1953), p. 423.

LORRAINE A. WEINBERGER, *Primary Examiner.*

S. B. WILLIAMS, *Assistant Examiner.*